US010059606B2

(12) United States Patent
Burrows

(10) Patent No.: US 10,059,606 B2
(45) Date of Patent: Aug. 28, 2018

(54) WATER PURIFICATION SYSTEM WITH AUTOMATIC FLUSH FLOW

(71) Applicant: Bruce D. Burrows, Valencia, CA (US)

(72) Inventor: Bruce D. Burrows, Valencia, CA (US)

(73) Assignee: DS Services of America, Inc., Atlanta, GA (US)

( * ) Notice: Subject to any disclaimer, the term of this patent is extended or adjusted under 35 U.S.C. 154(b) by 513 days.

(21) Appl. No.: 14/575,965

(22) Filed: Dec. 18, 2014

(65) Prior Publication Data

US 2015/0166369 A1 Jun. 18, 2015

Related U.S. Application Data

(60) Provisional application No. 61/917,835, filed on Dec. 18, 2013.

(51) Int. Cl.
| | |
|---|---|
| *C02F 1/44* | (2006.01) |
| *B01D 65/02* | (2006.01) |
| *C02F 9/00* | (2006.01) |
| *B01D 61/02* | (2006.01) |
| *B01D 61/08* | (2006.01) |

(Continued)

(52) U.S. Cl.
CPC ............ *C02F 1/441* (2013.01); *B01D 61/025* (2013.01); *B01D 61/08* (2013.01); *B01D 65/02* (2013.01); *C02F 9/005* (2013.01); *B01D 2311/04* (2013.01); *B01D 2311/06* (2013.01); *B01D 2311/2649* (2013.01); *C02F 1/283* (2013.01); *C02F 1/505* (2013.01)

(58) Field of Classification Search
None
See application file for complete search history.

(56) References Cited

U.S. PATENT DOCUMENTS

| 4,585,554 A | 4/1986 | Burrows |
|---|---|---|
| 4,595,497 A | 6/1986 | Burrows |

(Continued)

FOREIGN PATENT DOCUMENTS

DE 2850663 A1 * 6/1980 ............ B01D 61/08

OTHER PUBLICATIONS

DE2850663A1—EPO Machine Translation, 2017, 5 pages.*

*Primary Examiner* — Patrick J Orme
(74) *Attorney, Agent, or Firm* — Seyfarth Shaw LLP; Brian Michaelis

(57) ABSTRACT

The improved water purification system includes a water purification unit having a tap water inflow port for receiving a tap water inflow from a water supply system to produce relatively purified water and a brine water outflow having impurities concentrated therein. An RO filter having an RO membrane separates relatively unfiltered water flow into purified water and the brine water outflow. A flush flow activation chamber fluidly coupled to the brine water outflow includes a plunger for substantially occluding brine water outflow through the brine outflow port when seated, and substantially permits brine water outflow to exit the purification unit through the brine outflow port when unseated. Accordingly, the activation chamber generates back pressure within the water purification system to flash flow tap water inflow into the purification unit and through the RO membrane when the plunger moves from being seated to unseated, thereby substantially refreshing said RO membrane.

27 Claims, 17 Drawing Sheets

(51) Int. Cl.
 *C02F 1/28* (2006.01)
 *C02F 1/50* (2006.01)

(56) References Cited

U.S. PATENT DOCUMENTS

| 4,657,674 | A | | 4/1987 | Burrows | |
|---|---|---|---|---|---|
| 5,045,197 | A | | 9/1991 | Burrows | |
| 7,837,866 | B2 | * | 11/2010 | Burrows | B01D 61/04 210/110 |
| 8,298,420 | B2 | | 10/2012 | Burrows | |

* cited by examiner

WATER PURIFICATION SYSTEM WITH AUTOMATIC FLUSH FLOW

BACKGROUND OF THE INVENTION

The present invention generally relates to improvements in water purification systems of the type having a reverse osmosis (RO) unit or the like for removing dissolved ionic material and other contaminants from an ordinary supply of tap water or the like. More particularly, the present invention relates to an improved water purification system having automatic flush flow for intermittently and automatically self-cleaning a reverse osmosis membrane and refreshing particulate catalyst matter in related pre- or post-filters.

Water purification systems in general are well-known in the art of the type having a reverse osmosis (RO) unit or membrane for converting an incoming supply of ordinary tap or feed water into relatively purified water for use in cooking, drinking, etc. In general terms, the reverse osmosis unit includes a semi-permeable RO membrane through which a portion of the tap water supply passes, such that the membrane acts essentially as a filter to remove dissolved metallic ions and the like as well as other contaminants and undesired particulate matter from the tap water. In normal operation, these impurities are removed from one portion of the water flow and concentrated in another portion of the water flow, commonly referred to as retentate or brine, which is normally discharged as waste to a drain. The thus-produced flow of relatively purified water is available for immediate dispensing for use, and/or for temporary storage within a suitable reservoir or vessel for later dispensing. A pure water dispense faucet mounted typically on or adjacent to a kitchen-type sink or the like is manually operable to dispense the produced purified water. While the specific construction and operation of such RO water purification systems may vary, such systems are exemplified by those shown and described in U.S. Pat. Nos. 4,585,554; 4,595,497; 4,657,674; and 5,045,197.

One disadvantage associated with reverse osmosis water purification systems relates to the fact that retentate or brine outflow from the RO membrane is normally discarded as waste. As a result, many residential and commercial water customers have favored use of bottled water as a purified water source, despite the costs and inconveniences associated with delivery, storage and changeover of large (typically 5 gallon) water bottles with respect to a bottled water cooler.

Another disadvantage associated with reverse osmosis water purification systems relates to the typically limited service life of the RO membrane and other pre- and post-filter elements. Many RO systems use a pre-filter element typically including a carbon-based filtration media for initial removal of contaminants from a tap water inflow at a location upstream from the RO membrane. One important function of this pre-filter element is to remove contaminants that would otherwise shorten the operating service life of the RO membrane. A downstream-located post-filter element is also commonly provided for additional water filtration and purification before dispensing. This array of pre- and post-filter elements, in combination with the RO membrane, is often provided in the form of individual cartridges designed for facilitated disassembly from and re-assembly with a unitary-type manifold. See, for example, U.S. Pat. No. 5,045,197, the contents of which are herein incorporated by reference. Despite the fact that cartridge replacement may be required only once each year, and despite efforts to make cartridge changeover an intuitively simple process, many customers are reluctant to handle this task. Instead, replacement of the various RO system cartridges has largely remained the responsibility of a water service company, thereby entailing regular and relatively costly service calls to each customer's residence or place of business. The requirement for regular service calls dramatically increases the overall operating cost of the RO system, thereby reducing or eliminating apparent advantages relative to conventional bottled water coolers and related bottle delivery systems.

There exists, therefore, a significant need in the art for further improvements in and to water purification systems, wherein the service life of a reverse osmosis (RO) membrane and/or related pre- or post-filter elements are significantly extended for at least a period of several years without requiring attention by service personnel through. Such improvements include the use of a flush-flow activation chamber that intermittently facilitates rapid injection of tap water inflow over the RO membrane to wash away accumulated particulate matter and to refresh particulate catalyst matter in pre- or post-filtration cartridges that may clump together during periods of relatively slow tap water inflow. The present invention fulfills these needs and provides further related advantages.

SUMMARY OF THE INVENTION

The water purification system with automatic flush flow disclosed herein includes a water purification unit having a tap water inflow port for receiving a tap water inflow from a water supply system to produce a supply of relatively purified water discharged from said unit via a purified water outflow port, and a brine water outflow having impurities concentrated therein and discharged from said unit via a brine outflow port. The purification unit also includes an RO filter having an RO membrane for separating relatively unfiltered water flow into the purified water and brine water outflows. A flush flow activation chamber fluidly coupled to the brine water outflow has a plunger that substantially occludes the brine water outflow through the brine outflow port when in a first seated position, and substantially permits brine water outflow to exit the purification unit through the brine outflow port when in a second unseated position. The activation chamber generates back pressure within the water purification system to flash flow tap water inflow into the purification unit and through the RO membrane when the plunger moves from the first position to the second position, thereby substantially refreshing said RO membrane.

Further with respect to the flush flow activation chamber, the plunger is generally an elongated cylindrical body having a substantially frusto-conical head sized for at least partial insertion into a seat adjacent the brine outflow port. This frusto-conical head includes a slot that permits brine water outflow through the brine water outflow port when the plunger is in the first seated position. Additionally, the plunger may also include a fin that at least partially increases fluid turbulence within the activation chamber for increasing activation back pressure, which may beneficially increase cleaning across the RO membrane.

Additionally, the purification unit may further include a pre-filter coupled between the tap water inflow port and the RO filter. The pre-filter preferably includes a solid carbon media for suspending impurities from said tap water inflow before delivery to the RO filter. The purification unit may also include a post-filter coupled between the RO filter and the purified water outflow port, wherein the post-filter includes a particulate catalyst media that preferably includes zinc.

The aforementioned purification unit may also be in the form of a multi-cartridge unit that includes an RO filter cartridge and a catalyst media cartridge and is adapted for unidirectional installation within a manifold housing. In this respect, the manifold housing and multi-cartridge unit may include inter-engageable ported members for sealed fluid-coupled engagement when the multi-cartridge unit is installed into said manifold housing. The manifold housing may carry the manifold base of the multi-cartridge unit in a slide unit configured for removable unidirectional seated installation, wherein the slide unit is movable between an extended position permitting access to and removal and replacement of the multi-cartridge unit, and a retracted position with the inter-engageable ported members in sealed fluid-coupled engagement. The water purification system, and specifically the manifold housing, may be coupled to a faucet via the purified water outflow port, for dispensing the produced purified water.

In another embodiment, the water purification system with automatic flush flow produces a supply of relatively purified water and a supply of brine water having impurities concentrated therein through use of a multi-cartridge unit having a manifold base with a tap water inflow port for receiving a tap water inflow from a water supply system, and a purified water outflow port and a brine outflow port for respectively discharging the purified water and brine water out from the multi-cartridge unit. In this embodiment, an RO filter cartridge is in flow-coupled relation with the manifold base and includes an RO membrane for separating the tap water inflow into purified water and brine water. A post-membrane cartridge in flow coupled relation with the manifold base between the RO filter and purified water outflow port houses a particulate catalyst media that preferably includes some zinc, to further purify the water being dispensed for consumption. The flush flow activation chamber is in flow-coupled relation with the brine water and has a throttle for substantially occluding brine water outflow to the brine outflow port when in a first position, and substantially permits brine water outflow to exit the multi-cartridge unit through the brine outflow port when in a second position. In this respect, the activation chamber generates back pressure within the water purification system to flash flow water through the RO filter cartridge and over the RO membrane sufficient to wash the membrane surface and sufficient to agitate and stir the particulate catalyst media when the throttle moves from the first position to the second position.

The throttle may include a slot formed from a portion of a substantially frusto-conical head to permit brine water outflow through the brine water outflow port when the throttle is in the aforementioned first position. To increase the threshold activation back pressure, the throttle may also include a radially outwardly projecting fin configured to resist movement from the first position to the second position.

The multi-cartridge unit may also include a pre-membrane cartridge in flow-coupled relation with the manifold base between the tap water inflow port and RO filter, and include a solid carbon media for suspending impurities from the tap water inflow. The multi-cartridge unit may also be adapted for removable unidirectional seated installation within a slide unit of a manifold housing, with the slide unit being movable between an extended position permitting access to and removal and replacement of the multi-cartridge unit, and a retracted position. The manifold housing and multi-cartridge unit preferably further include inter-engageable ported members for sealed fluid-coupled engagement when the multi-cartridge unit is installed into the manifold housing. Pure water may be dispensed out through the manifold housing to a faucet for consumption.

In another alternative embodiment described herein, a reusable multi-cartridge water purification unit with automatic flush flow is configured for unidirectional installation into a water purification system, and includes a manifold base having a tap water inflow port for receiving a tap water inflow from a water supply system, a purified water outflow port for discharging a relatively pure water outflow, and a brine outflow port for discharging a supply of brine water outflow having impurities concentrated therein. The multi-cartridge unit further includes a pre-membrane cartridge in flow-coupled relation with the tap water inflow and includes a carbon media for suspending impurities from said tap water inflow, a post-membrane cartridge including a particulate catalyst media (e.g., including zinc) in flow-coupled relation between an RO filter and purified water outflow port, and an RO water filtration cartridge having an RO membrane in flow-coupled relation with the manifold base between the pre- and post-membrane cartridges. The RO water filtration cartridge also includes a flush flow mechanism having a plunger therein substantially occluding brine water outflow when in a closed position, and substantially permitting brine water outflow when in an open position.

The plunger moves between the closed and open positions in response to a back pressure within the multi-cartridge unit. In this respect, the plunger effectively releases the back pressure at some threshold pressure by being pulled out from the closed position. This permits a flash flow of water over the RO membrane and through the particulate catalyst. To this end, the plunger may include a fin for increasing said threshold pressure. This mechanism substantially refreshes the RO membrane and stirs the particulate catalyst to prevent channeling. The plunger may include an elongated cylindrical body having a substantially frusto-conical head sized to occlude the brine outflow port. Additionally, the plunger may also include a slot formed from the frusto-conical head to permit brine water outflow through the brine water outflow port when the plunger is in the closed position. The flash flow of water through the post-membrane cartridge is sufficient to lift and turbulently stir the particulate catalyst media inside in a manner to remove an oxidation layer thereon and for flushing this removed oxidation layer out from the post-membrane cartridge. This feature of the water purification system effectively refreshes the particulate catalyst media.

The water purification system may also include a manifold housing that includes a slide unit for unidirectional receipt of the multi-cartridge unit. Here, the slide unit is movable between an extended position permitting access to and removal and replacement of the multi-cartridge unit, and a retracted position with the multi-cartridge unit housed within the manifold housing. The manifold housing and multi-cartridge unit preferably include inter-engageable ported members for sealed fluid-coupled engagement when the multi-cartridge unit is installed into said manifold housing, e.g., when in the "retracted" position.

Other features and advantages of the present invention will become apparent from the following more detailed description, when taken in connection with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
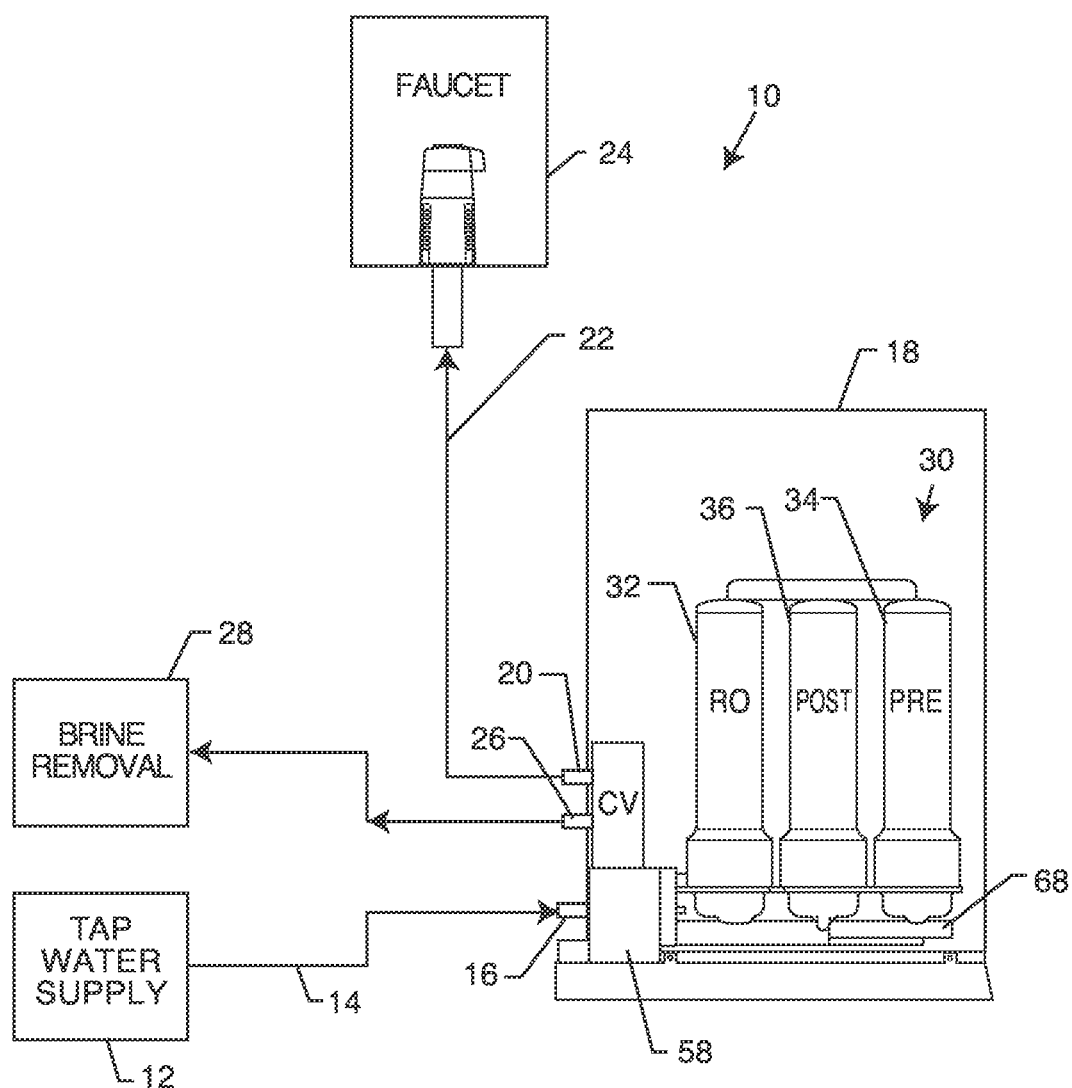
FIG. 1 is a schematic diagram illustrating deployment of a water purification system in accordance with the present invention.

As shown in the exemplary drawings for purposes of illustration, an improved water purification system is referred to generally by the reference numeral 10 in FIG. 1. In general, the water purification system 10 disclosed herein is designed to provide improved filtration characteristics of the type of filtration systems that use reverse osmosis ("RO") membrane-based water filtration cartridges and/or catalyst-based filtration cartridges. In this respect, the water filtration system 10 includes a flush-flow activation chamber that intermittently and automatically reenergizes the RO membrane and/or particulate catalyst by facilitating periodic rapid injection of tap water inflow to wash build-up off the RO membrane, which otherwise decreases membrane performance and service life, and to agitate the particulate catalyst. More specifically, the flush-flow activation chamber, as described in detail below, generates back pressure within the filtration system 10, the release of which results in rapid injection of tap water inflow. Rapid movement of fresh or additional tap or unfiltered water inflow into the filtration cartridges increases the velocity of water traveling over and against the RO membrane to break up build-up thereon, and increases the velocity of water travelling through the particulate catalyst further intermixing or agitating the matter to sufficiently prevent clumping or grouping of the matter that may otherwise form during periods of relatively slow tap water inflow.

As shown in FIG. 1, the water purification system 10 receives tap water inflow from a tap water supply 12 via a tap water inflow conduit 14 coupled to an input port 16 shown in FIG. 1 protruding generally out from a rear portion of a manifold housing 18. The water purification system 10 separates this tap water inflow, as explained in more detail below, into relatively purified water and a so-called retentate or brine flow having contaminants and impurities substantially concentrated therein. As shown in FIG. 1, the purified water exits the water purification system 10 through a pure water outlet port 20 for travel through a pure water conduit 22 to a faucet 24 or the like for on-demand dispensing. Alternatively, the pure water conduit 22 may be coupled to a water reservoir where pure water is stored before dispensing, as is generally known in the art. The retentate or brine water separated from the pure water during the purification process exits the water purification system 10 through a brine water outlet port 26 similarly mounted to and protruding out from a rear portion of the manifold housing 18. The retentate or brine water is then discarded or recycled as generally identified by a brine removal box 28. The brine water is preferably recycled to a hot water side or hot water circuit of a domestic water supply system to avoid water waste in accordance with the embodiments shown and described in U.S. Pat. No. 8,298,420, the contents of which are herein incorporated by reference. Alternatively, and certainly less preferably, the retentate or brine water may simply be disposed from the system via a drain.

The water purification system 10 is designed to provide a ready supply of substantially purified water for drinking, cooking, etc. through the faucet 24 or other comparable device that preferably utilizes or preferably requires substantially pure water (e.g., an ice maker). The system 10 is generally designed for residential or household use, or for use in a commercial facility particularly such as an office or the like, installed typically within the compact cabinet space located beneath a kitchen-type sink or the like, with the pure water dispense faucet 24 normally mounted externally thereof such as on a countertop or adjacent sink for on-demand pure water dispensing. In one embodiment, the pure water dispense faucet 24 may be installed alongside or in close proximity with a conventional faucet or faucet set including cold and hot water faucet valves operable for respectively dispensing of untreated cold water and untreated hot water, or a temperate mixture thereof, through one or more dispense spouts, as shown in the U.S. Pat. No. 8,298,420.

In another embodiment, as part of brine removal 28, the brine water outflow may connect to a standard domestic water supply system (not shown) having a tap water supply coupled to a cold water circuit and related cold water faucet, and a hot water circuit and related hot water faucet. Persons skilled in the art will recognize that single-handle faucet sets can be used for dispensing cold water, hot water, or a tempered mixture thereof. The brine water removed via the water purification system 10 may be utilized or connected to one or both of the cold water or hot water taps for dispensing during normal water usage, such as for purposes of washing or bathing, i.e., uses that otherwise do not require substantially purified water, such as may be desired for consumption (e.g., drinking water or purified ice cubes).

During normal operation, the tap water inflow passes through the water purification system 10 for treatment by a multi-cartridge filtration unit 30 that preferably includes a trio of cartridges such as a reverse osmosis (RO) water filtration cartridge 32, a pre-filtration cartridge 34 and/or a post-filtration cartridge 36. Persons of ordinary skill in the art will readily recognize that various combinations and quantities of filtration cartridges may be used with the water purification 10 disclosed herein based on the desired filtration requirements. Preferably, the water filtration system 10 includes at least one RO cartridge 32 having an RO membrane 38 (FIGS. 8 and 13-14) therein for separating the tap water inflow into a relatively purified water supply and brine water. The pure water may be stored in a reservoir, as shown in detail in U.S. Pat. No. 8,298,420, or produced on-the-fly to facilitate on-demand dispensing through the faucet 24 or the like. Simultaneously, brine water is preferably recycled to a hot water side of a domestic water system, as may be generally referenced herein at the brine removal box 28. Persons of ordinary skill in the art will recognize that there may be different mechanisms for providing on-demand or substantially on-demand delivery of purified water flow for consumer use, and that there may be a variety of compatible mechanisms for recycling or disposing the brine water.

Persons skilled in the art will also recognize and appreciate that the purified water has impurities substantially removed therefrom, whereas these removed impurities are retained within and carried off by the retentate or brine flow for recycling to the water supply system in the preferred embodiment. This retentate or brine water may, alternatively, be dispensed by other means, including to a drain. While the term brine is commonly used to refer to this retentate flow, persons skilled in the art will understand that the level of impurities carried by this brine flow does not render the water toxic or harmful for a wide range of traditional domestic water supply uses such as washing, bathing, etc. Indeed, when this retentate or brine water intermixes with other water within the water supply system, the proportional increase in overall impurities is virtually unnoticeable.

Figure 2:
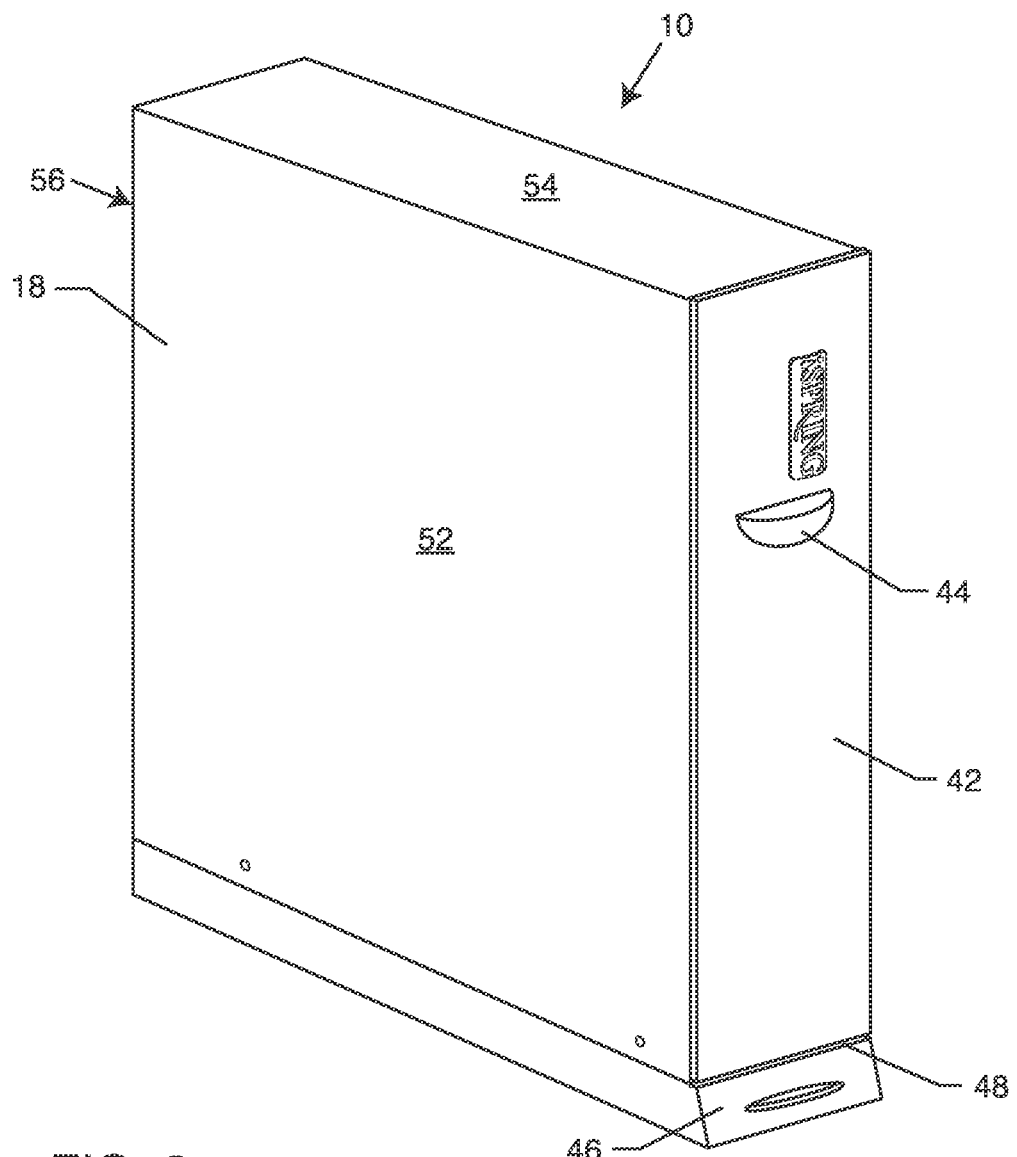
FIG. 2 is an enlarged perspective view showing an exemplary manifold housing of the water purification system.

FIGS. 2-5 more specifically illustrate the water purification system 10 for use in association with a removable and replaceable multi-cartridge filtration unit 30. Specifically, FIG. 2 illustrates the water purification system 10 including the outer housing or manifold cover 18 having a slidable or a movable drawer 40 (FIG. 3) therein with a front margin that includes a closure panel 42. An externally accessible drawer pull 44 formed from a portion of the closure panel 42 facilitates manual movement of the drawer 40 between an open position (e.g., FIGS. 3-4) with a portion of the drawer 40 exposed at a front end of the water purification system 10, and a closed position (e.g., FIGS. 2 and 5). The water purification system 10 further includes a clearance ramp 46 positioned below the closure panel 42 to facilitate alignment when sliding the drawer 40 from the open position to the closed position. For example, the weight of the multi-cartridge filtration unit 30 may cause a bottom leading edge 48 of the closure panel 42 to deflect downwardly when the slidable drawer 40 is in the open position shown in FIGS. 3-4. Accordingly, sliding the drawer 40 to the closed position shown in FIGS. 2 and 5 allows this edge 48 to slide traverse upwardly along the inclined surface of the ramp 46 to position the closure panel 42 into the substantially closed, locked and aligned position shown best in FIG. 2.

Figure 3:
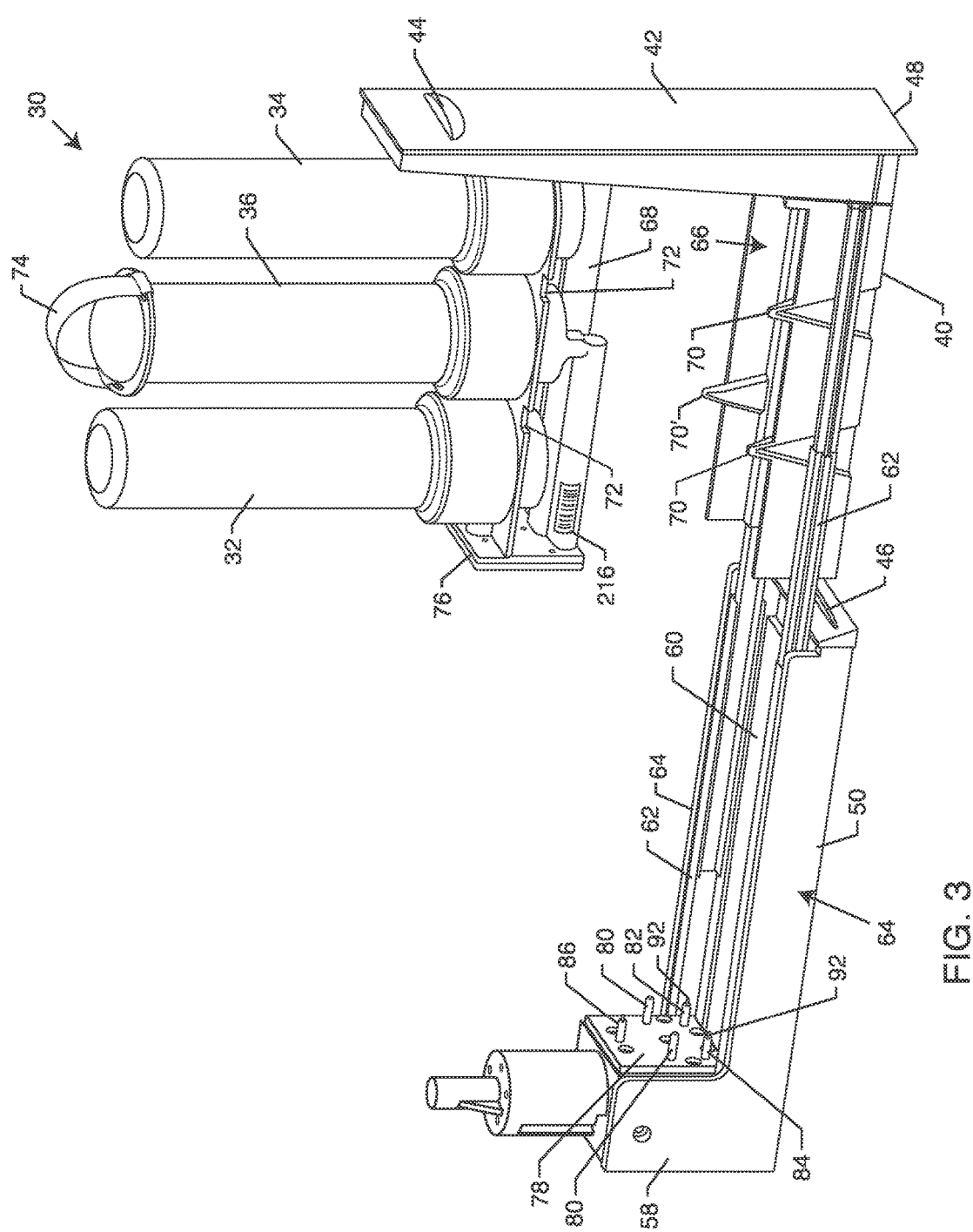
FIG. 3 is a partially exploded perspective view of the manifold housing of FIG. 2, with a housing cover removed to illustrate the internally mounted components, and specifically illustrating a slidable drawer in an open position and showing a selectively removable multi-cartridge unit in exploded relation therewith.
Figure 4:
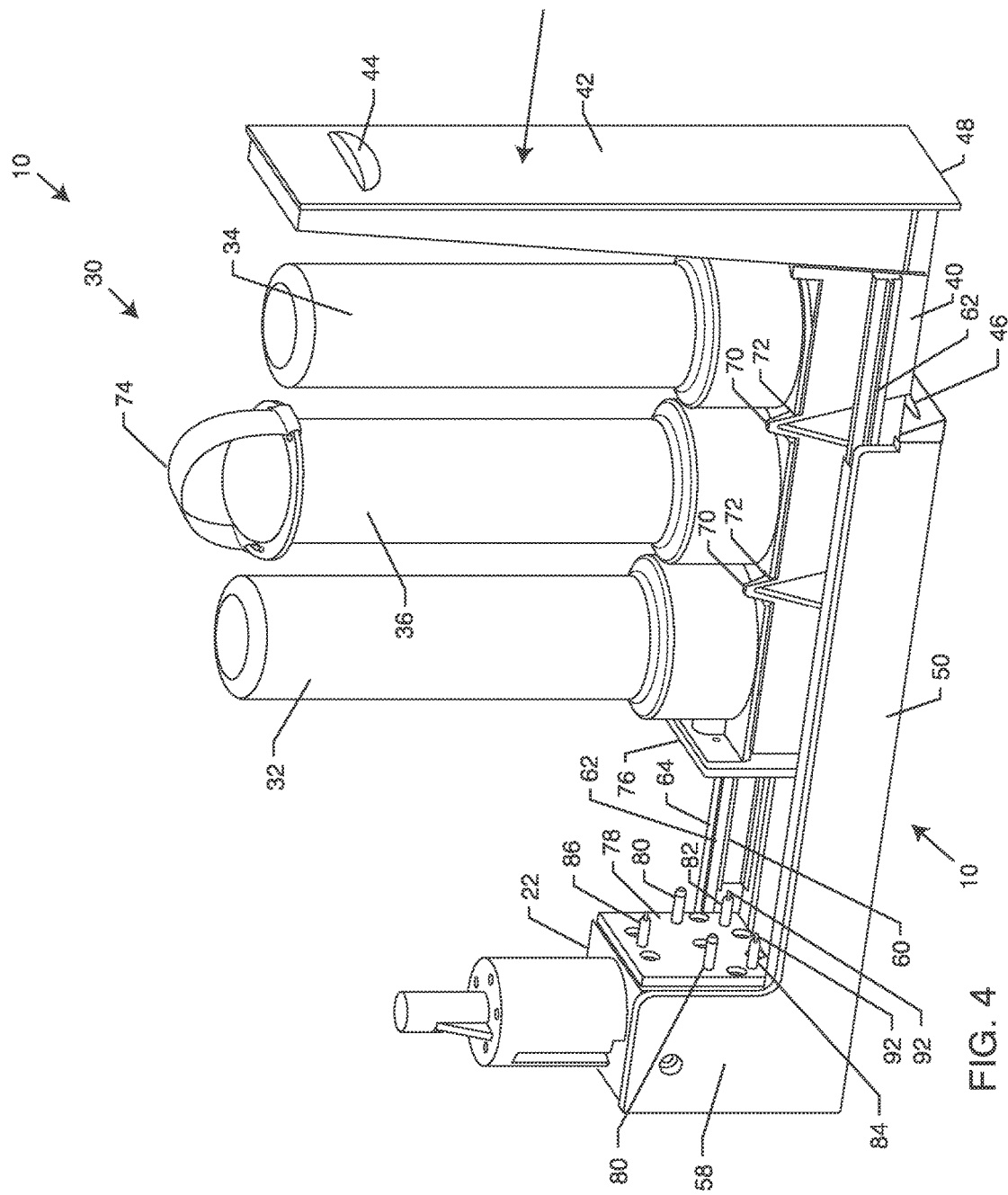
FIG. 4 is an enlarged perspective view of the manifold housing similar to FIG. 3, illustrating the slidably retractable drawer carrying the removably mounted multi-cartridge unit.
Figure 5:
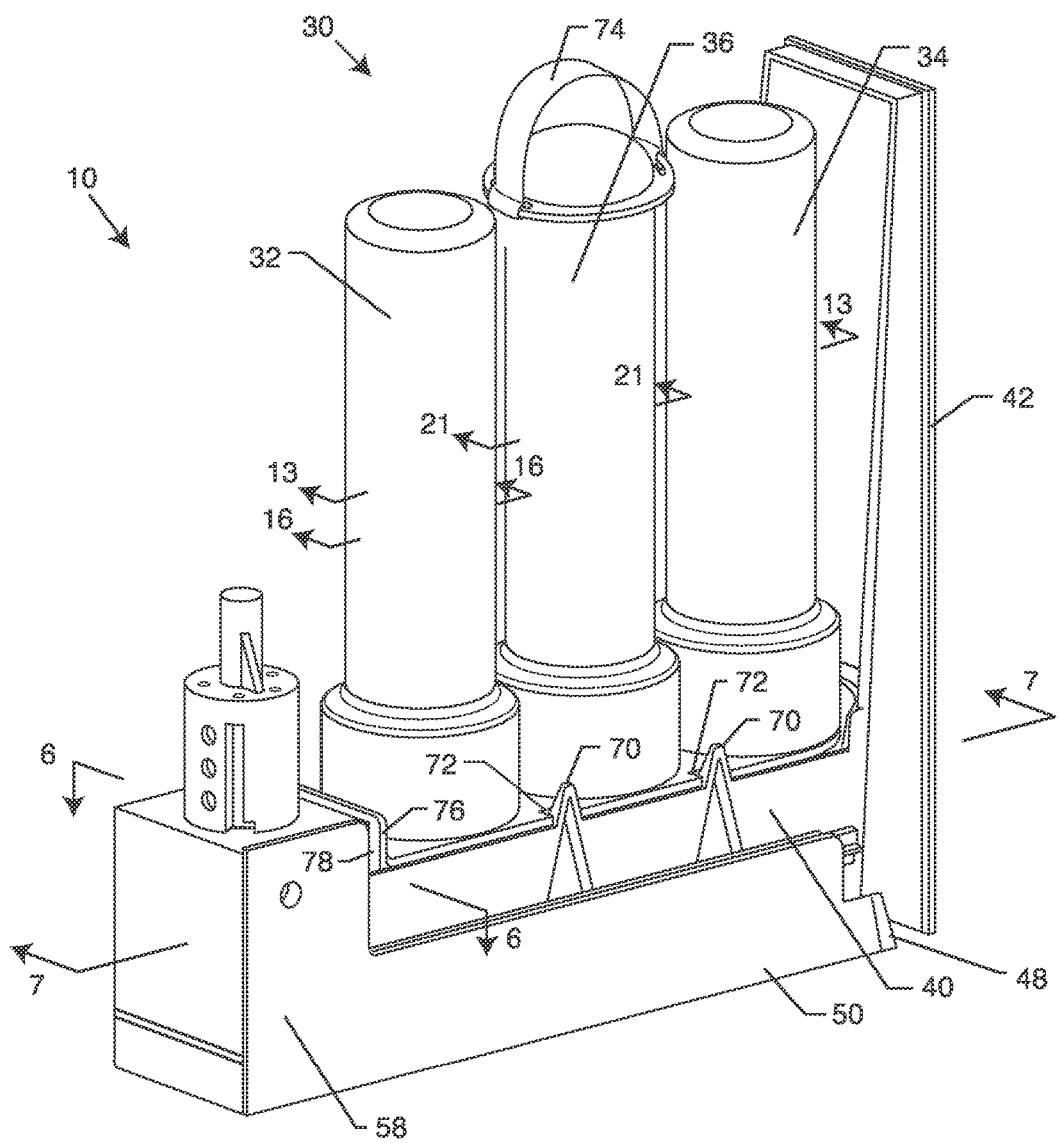
FIG. 5 is an alternative perspective view of the manifold housing similar to FIG. 4, with the housing cover removed and showing the slidable drawer with multi-cartridge unit in a fully installed position.

The water purification system 10 further includes an internal base 50, shown best in FIGS. 3-5, preferably generally encased or shielded from the external environment by the manifold housing 18. In this respect, the system 10 includes a pair of side panels 52 (e.g., one shown in FIG. 2) that attach to each respective portion of the manifold housing 18 about a substantially horizontal top panel 54. The side panels 52 may include a flanged rear portion extending substantially the vertical height of the manifold housing 18 and may include a series of screw holes, connectors or the like to permit attachment to a rear panel 56 (FIG. 2) in a manner similar to well known mechanisms for securing side panels to computer cases. When assembled, the closure panel 42, the side panels 52, the top panel 54 and the back panel 56 substantially enclose and protect the operational aspects of the water purification system 10, such as the multi-cartridge filtration unit 30 and related filtration cartridges 32, 34, 36 and a fixed manifold 58 mounted generally at an inboard end of the back panel 56.

Figure 8:
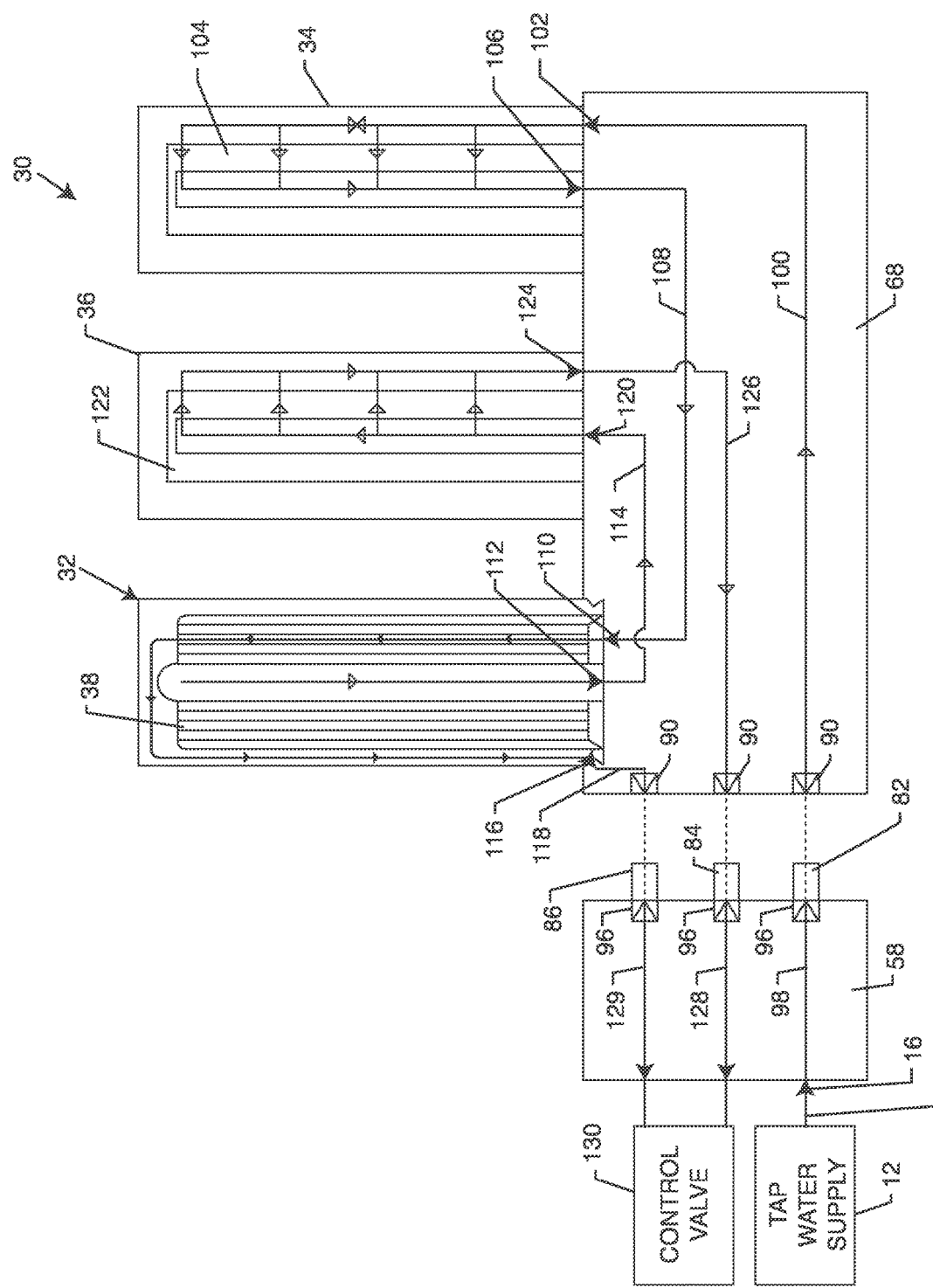
FIG. 8 is a schematic flow diagram indicating water flow through the manifold housing and the multi-cartridge unit when removably installed therein.
Figure 9:
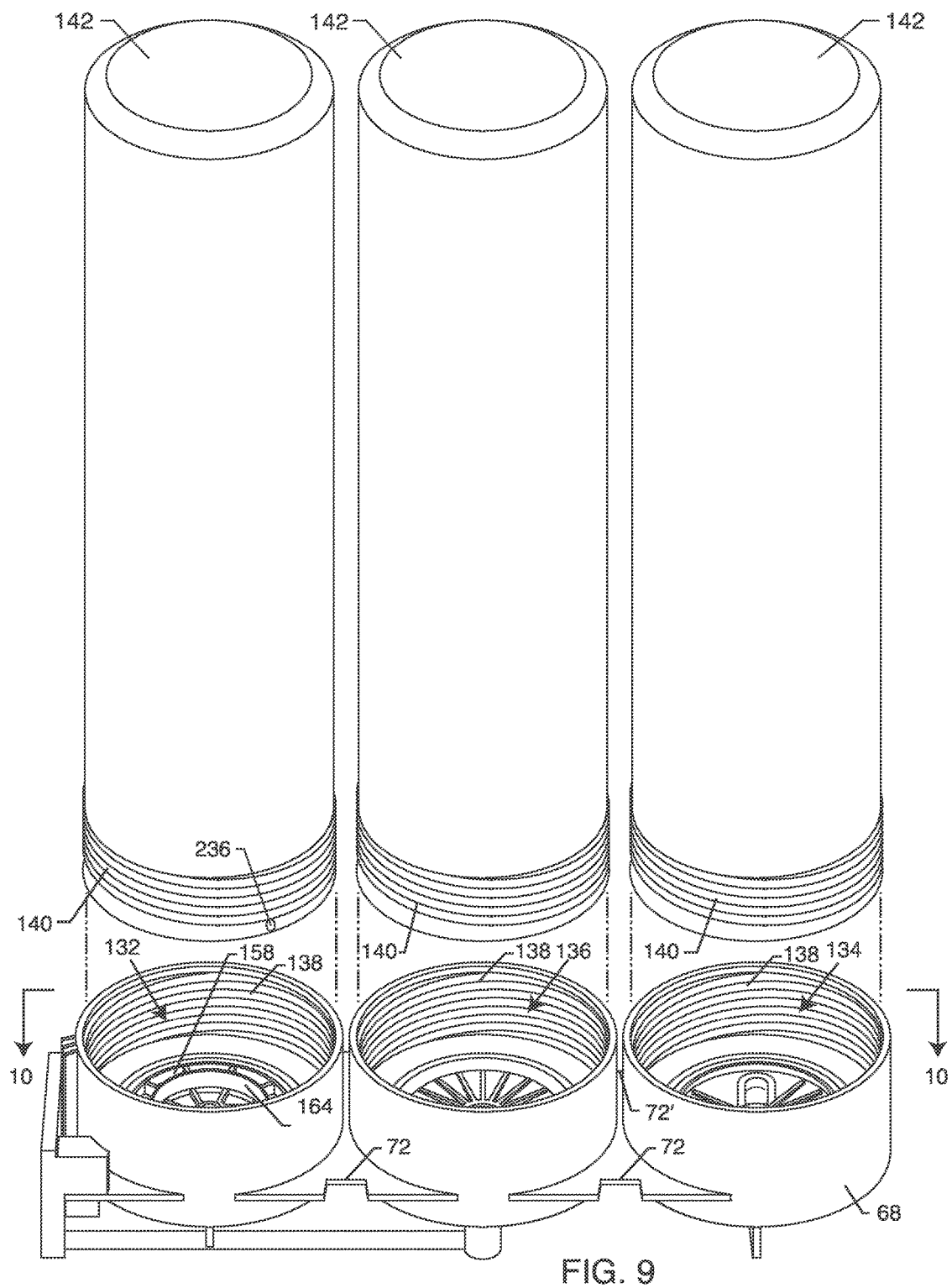
FIG. 9 is a partial exploded perspective view of the cartridge carrier housings relative to the respective cartridge carriers formed in the manifold base.

The internal base 50 has a set of horizontal telescoping slides coupled thereto that include a first base slide 60 positioned substantially underneath the slidable drawer 40 and a pair of sidewall slides 62 that respectively attached to inside portions of a pair of upstanding wall segments 64. The base slide 60 provides support for the drawer 40 while the sidewall slides 62 stabilize side-to-side movement and are adapted to permit sliding movement of the drawer 40 between the open/extended and closed/retracted positions within the manifold housing 18. As best shown in FIG. 3, the drawer 40 generally forms into an upwardly open pocket 66 configured for drop-in reception of a manifold base 68 of the multi-cartridge filtration unit 30. The drawer pocket 66 includes a series of irregular surfaces such as the illustrative triangular extensions 70 formed at longitudinally off-center positions along the drawer length for mated reception into a set of corresponding notches 72 formed in the manifold base 68 of the multi-cartridge filtration unit 30. In a particularly preferred embodiment, the slidable drawer 40 includes a pair of triangular extensions 70 formed on one side, e.g., as shown in FIG. 3, and a single triangular extension 70' formed on an opposite side. These extensions 70, 70' mate with respective notches 72, 72' (FIGS. 8 and 9). This keyed system between the slidable drawer 40 and the manifold base 68 ensures unidirectional or one-way drop-in reception of the multi-cartridge filtration unit 30 because the pair of notches 72 are configured only to receive the respective pair of triangular extensions 70, while the lone notch 72' on the opposite side (shown in FIG. 10) is configured only to receive the lone triangular extension 70' (FIG. 3).

The multi-cartridge unit 30 may include a mechanism to facilitate transportation of the trio of cartridges 32, 34, 36, which are preferably preassembled on the manifold base 68 before placement into the open pocket 66. In the embodiment shown in FIGS. 3-5, a handle 74 is shown formed from or otherwise attached to the post-filtration cartridge 36. In this embodiment, the handle 74 is made from a flexible reinforced polyester or comparable fabric material (e.g., canvas) extending a sufficient distance above the top of cartridge 36 to permit manual grasping or handling. Preferably the fabric-based handle 74 is collapsible upon release to occupy minimal space within the manifold housing 18, thus maximizing the usable heights of cartridges 32, 34, 36 and further enhancing the service life of the multi-cartridge unit 30. In this respect, the handle 74 is of a size and shape that permits easy manual grasping and manipulation of the multi-cartridge unit 30 for quick and easy drop-fit installation into or lift-out removal from the manifold housing 18. Alternative embodiments of the handle 74 may include a single handle that interconnects one or more of the cartridges 32, 34, 36, or multiple independent handles attached to one or more of the cartridges 32, 34, 36. In the former embodiment, the handle conveniently interconnects the upper ends of one or more of the three cartridges 32, 34, 36.

Once the multi-cartridge unit 30 seats into the slidable drawer 40 as shown in FIG. 4, the drawer 40 is closed by placing a force against the closure panel 42 along the directional arrow shown therein. The drawer 40 slides inwardly as the telescoping slides 60, 62 collapse on themselves to reposition and close the drawer 40 within the manifold housing 18. The manifold base 68 is configured to define a predetermined sequential flow path of water through the cartridges 32, 34, 36 for optimal filtration of undesirable particulates from the tap water supply 12 when engaged with the fixed manifold 58. In this regard, the manifold base 68 includes a ported end plate 76 configured for slide-fit connection with a complementary mounting plate 78 coupled to the fixed manifold 58. The mounting plate 78 includes a pair of stationary cylindrical alignment pins 80 and a set of cylindrical water conduit members, including a tap water inflow coupler 82, a pure water outflow coupler 84 and a brine water outflow coupler 86. As shown in FIGS. 3 and 4, the alignment pins 80 and each of the couplers 82, 84, 86 extend or protrude outwardly from the mounting plate 78 of the fixed manifold 58 and are configured for slide-fit engagement with the ported end plate 76.

Closing the slidable drawer 40 to the position shown in FIG. 2 engages the ported end plate 76 with the fixed manifold 58 in fluid-coupled relation. The alignment pins 80 are designed to engage reciprocal bores (not numbered) in the end plate 76 to correctly align the manifold base 68 with the fixed manifold 58 such that engagement between the ported end plate 76 and the couplers 82, 84, 86 automatically functions to provide the correct fluid flow paths for proper operation of the water purification system 10. Persons skilled in the art may recognize that other alignment mechanisms or couplers may be used in place of or in addition to the alignment pins 80 or in place of or in addition to couplers 82, 84, 86.

Figure 6:
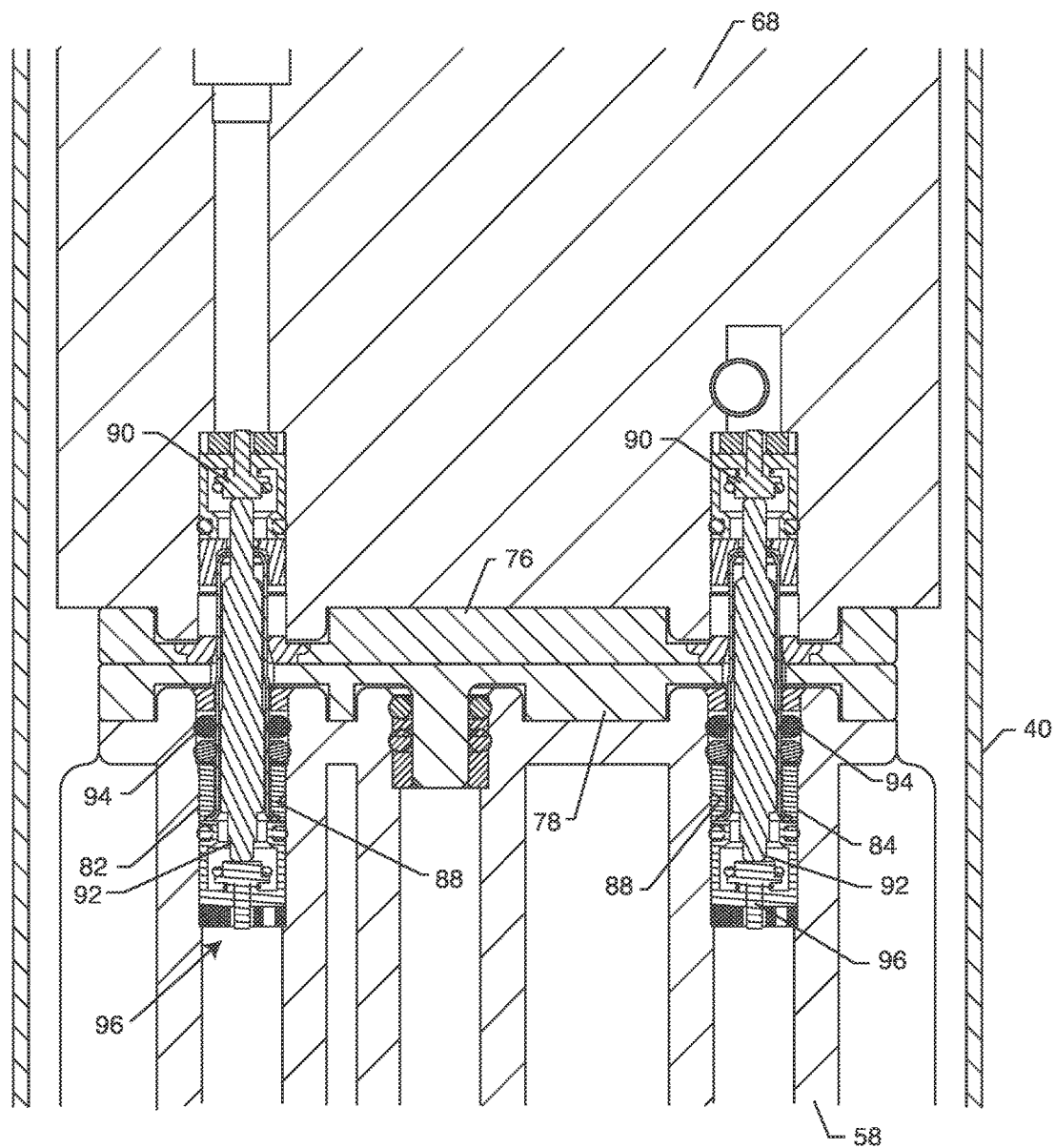
FIG. 6 is an enlarged fragmented cross-sectional view taken generally on the line 6-6 of FIG. 5, illustrating the multi-cartridge unit fluidly coupled to the manifold housing.
Figure 7:
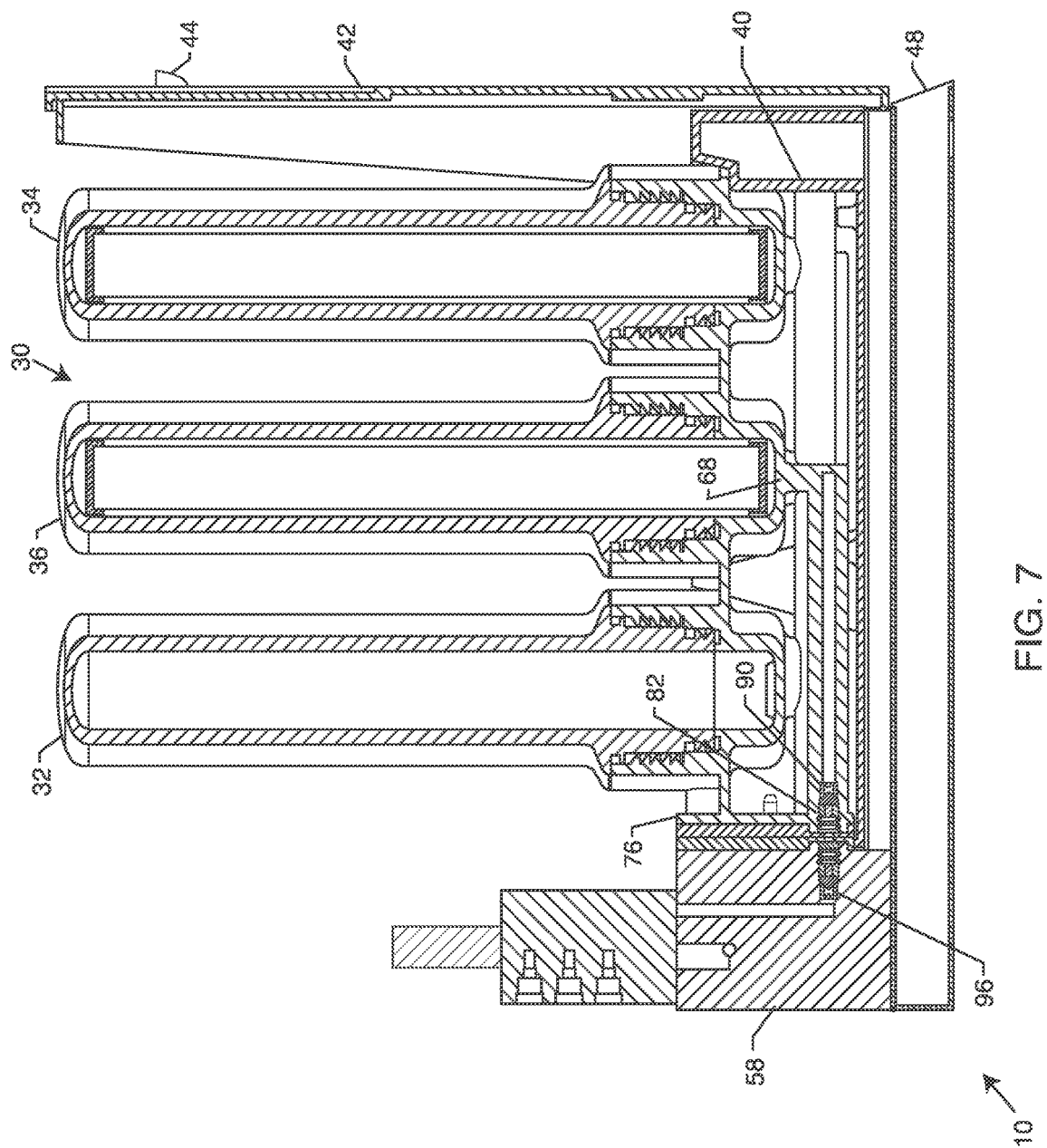
FIG. 7 is a vertical sectional view taken generally on the line 7-7 of FIG. 5, illustrating the internal components of the multi-cartridge unit and manifold housing.

Each of the couplers 82, 84, 86 extend out from the fixed manifold 58 to engage complementary ports 88 (FIG. 6) formed in the end plate 76. The couplers 82, 84, 86 and the end plate ports 88 include a check valve 90 spring-loaded to a normally closed position to prevent water leakage therefrom. Each check valve 90 is adapted for push-fit engagement and partial retraction by a probe 92. The couplers 82, 84, 86 carry one or more seal rings 94 that provide slidably sealed engagement with the end plate ports 88 prior to opening movement of the associated check valve 90. Similarly, each coupler 82, 84, 86 is mounted on the fixed manifold 58 for accommodating a short axial retraction stroke of the associated probe 92 upon registration with the check valve 90 of the associated end plate port 88, for displacing a second, normally closed spring-loaded check valve 96 (within the fixed manifold 58) to an open position. Accordingly, slide-fit coupling of the end plate ports 88 with the couplers 82, 84, 86 is accompanied by opening the check valves 90, 96 to permit water flow, whereas slide-out separation is accompanied by spring-loaded re-closure of the check valves 90, 96 to prevent water leakage. FIG. 7 is a cross-sectional view illustrating the multi-cartridge filtration unit 30 installed within the slidable drawer 40, with the drawer 40 advanced to the closed position for assembling the ported end plate 76 in flow-coupled relation with the coupler 82 of the fixed manifold 58. Couplers 84, 86, while not shown in the cross-sectional view of FIG. 7 couple to the ported end plate 76 in a similar manner.

With the multi-cartridge unit 30 installed into the manifold housing 18 and the manifold base 68 in flow-coupled relation with the fixed manifold 58, production of pure water proceeds in a normal manner. In this regard, as shown in the schematic diagram in FIG. 8, the fixed manifold 58 receives tap water inflow from the tap water supply 12 via the tap water inflow conduit 14 (see also FIG. 1) and the related inlet port 16. The fixed manifold 58 includes a flow path 98 therein that delivers the tap water inflow to the manifold base 68 when the aforementioned probe 92 engages the check valves 90, 96 to provide fluid-coupling therebetween via the tap water inflow coupler 82 (FIGS. 3-4). This tap water inflow then travels through a flow path 100 to the pre-membrane filter cartridge 34 via a pre-membrane inlet port 102. In the preferred form, the pre-membrane filter cartridge 34 may include a conventional carbon filter 104 having filtration media for capturing contaminants that may be present in the tap water inflow. From there, the pre-filtered water exits the pre-membrane filter cartridge 34 via a pre-membrane outlet port 106 and the manifold base 68 routes the filtered water flow via a flow path 108 to an RO inlet port 110 for supplying the filtered water flow to the RO cartridge 32 having a conventional semi-permeable RO membrane 38 therein. During pure water production, the RO membrane 38 separates the water inflow into two water outflows, namely relatively purified water that exits the RO cartridge 32 through a purified water outflow port 112 coupled to a flow path 114 leading to the post-cartridge 36, and brine water that exits the RO cartridge 32 through a brine water outlet port 116 coupled to a flow path 118 leading back to the fixed manifold 58 for eventual use or disposal.

In the preferred embodiment disclosed herein, the produced relatively purified water exiting the RO cartridge 32 via the purified water outlet port 112 travels next to the post-filtration cartridge 36 through the manifold base 68 via the flow path 114. Here, the purified water enters the post-membrane cartridge 36 through a post-filtration inlet port 120. The post-membrane cartridge 36 may also include a conventional carbon-based filtration media such as a particulate catalyst 122 for capturing and removing residual contaminants from the pure water flow. From this post-membrane filter cartridge 36, the purified water exits through a post-membrane outlet port 124 into a flow path 126 in the manifold base 68. This substantially purified water flow in the flow path 126 exits the manifold base 68 through the pure water outflow coupler 84 in parallel with the brine water outflow exiting the manifold base 68 through the brine water outflow coupler 86 via the flow path 118. The fixed manifold 58, in turn, defines internal flow paths 128 and 129 for coupling the filtered pure water and the brine water respectively to a control valve 130.

The control valve 130 is preferably mounted on the fixed manifold 58 within the housing 18 and able to regulate the production of pure water in accordance with the embodiments disclosed herein. For example, the control valve 130 may include any of the control valves disclosed in the U.S. Pat. No. 8,298,420. These valves may be particularly preferred in the event the system 10 is used in connection with a storage reservoir. Additionally, the control valve 130 also preferably regulates whether the brine flow is recycled back into the water system for use in cleaning or bathing, or whether the brine water is discarded to a drain.

FIGS. 9-21 more specifically illustrate the details and operational aspects of the cartridges 32, 34, 36 in connection with an automatic flush-flow activation chamber that intermittently and automatically self-cleans the RO membrane 38 and reenergizes filter particulate and the like to significantly extend the operational service life of the multi-cartridge unit 30 by several years over known products. Additionally, the flush-flow activation chamber enhances the quality of water purification in the water purification system 10 because the RO membrane 38, particulate matter or other water purification devices remain substantially clean and energized while in service.

Figure 10:
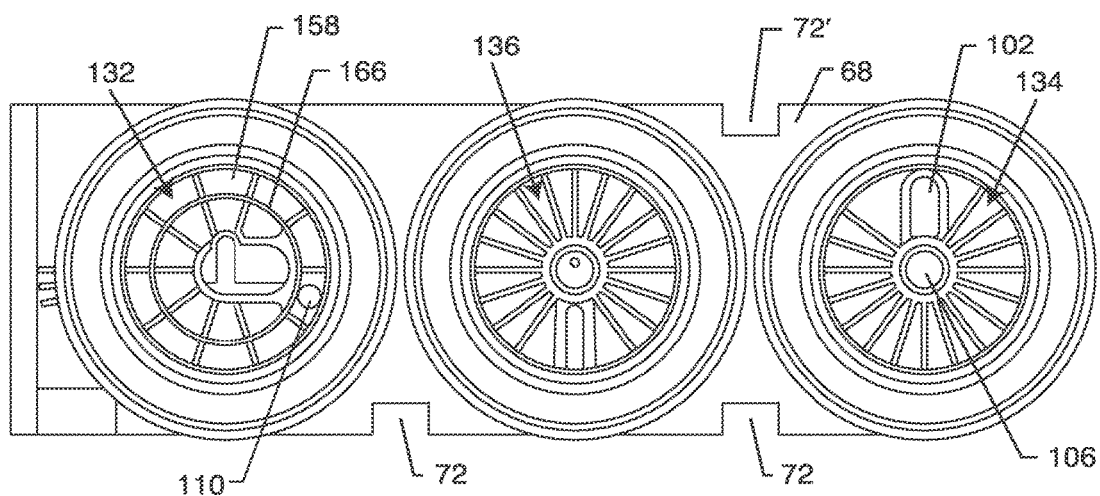
FIG. 10 is a top planar view of the cartridge carrier taken about the line 10-10 in FIG. 9, and further illustrating the flow paths within the manifold base that couple to the RO filtration cartridge, the pre-membrane cartridge and post-membrane cartridge.

For instance, with respect to the embodiments disclosed above, FIGS. 9 and 10 more specifically illustrate the manifold base 68 having a set of threaded cartridge carriers, including an RO cartridge carrier 132, a pre-membrane cartridge carrier 134 and a post-membrane cartridge carrier 136. As shown, each of the cartridge carriers 132, 134, 136 include internal threads 138 configured to rotatably engage through threaded reception of a set of exterior threads 140 formed along an exterior surface of a corresponding set of carrier cartridge housings 142. Threaded engagement of the cartridge housings 142 to the carrier cartridges 132, 134, 136 produces an air and water-tight seal to prevent leakage during normal operation of the water purification system 10. In this respect, in one embodiment, the threads may include a sealant to prevent such leakage. Although, it is preferred that the threads 138 and 140 provide sealing engagement without the use of a sealant or other chemical therein. During non-use and when the multi-cartridge unit 30 is no longer in the manifold housing 18, such as during service or replacement, the carrier cartridge housings 142 may be unscrewed from their respective cartridge carriers 132, 134, 136 to gain access to the water filtration equipment inside. Thus, the multi-cartridge unit 30 can be removed out from within the manifold housing 18 and returned to the manufacturer to have the RO membrane, carbon-based particulate matter or the carbon-based filter element removed and replaced or recharged. This way, the manifold base 68 can be reused when the old filtration media is removed or needs replacing.

FIG. 10 more specifically illustrates the flow paths in the manifold base 68 that channel tap water, pure water and/or brine water in and among the various cartridge carriers 132, 134, 136. For instance, in view of the diagrammatic view of FIG. 8, tap water inflow that enters the manifold base 68 through the tap water inflow coupler 82 travels to the pre-membrane filtration cartridge 34 via the flow path 100. In FIG. 10, the pre-membrane inlet port 102 is shown in the base of the pre-membrane cartridge carrier 134. In this embodiment, the tap water inflow is initially filtered through the pre-membrane cartridge 34, such as the carbon filter 104 shown in FIGS. 11-13. The carbon filter 104 includes a cartridge carrier coupler 144 (FIG. 11) generally extending out from a lower base of the cartridge unit that selectively slidably engages the pre-membrane outlet port 106 (FIG. 10). This cartridge carrier coupler 144 includes a pair of o-rings 146, 146' preferably made from a somewhat deformable material such as rubber to ensure an air-tight and water tight seal between the cartridge carrier coupler 144 and the pre-membrane outlet port 106. This seal prevents filtered water from intermixing with the tap water inflow entering the pre-membrane filtration cartridge 34. In this respect, tap water inflow entering the pre-membrane cartridge 34 through the pre-membrane inlet port 102 surrounds the carbon filter 104 within a chamber formed by a gap or space 148 (FIG. 13) between the exterior surface of the carbon filter 104 and the interior surface of the carrier cartridge housing 142. In this embodiment, the carbon filter 104 includes a solid interior carbon-based filter media 150 surrounded by an exterior sheath 152 compressed or held tightly to the outside of the media 150 by a somewhat stretchable or elastic netting 154 made from plastic or a comparable polymer. The solid carbon media 150 filters the tap water supply by suspending impurities as the fluid makes its way through the filter media 150 and into a central tube 156 coupled to the pre-membrane outlet port 106. The filter media 150 helps remove debris and particles from the tap water inflow that could damage the RO membrane 38. Furthermore, removing such impurities helps avoid clogging that might decrease the effectiveness of other water filtration equipment in the system 10.

Figure 11:
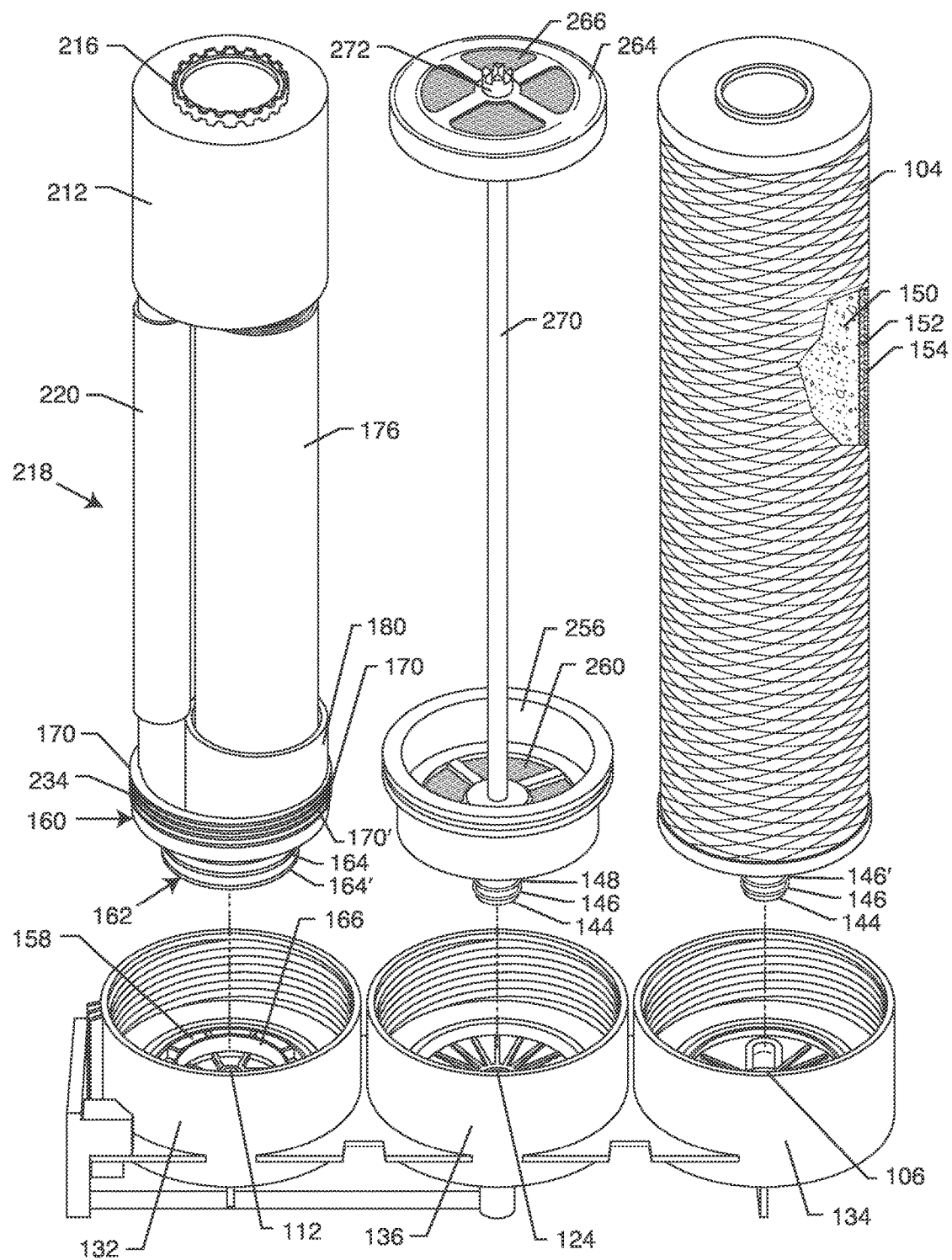
FIG. 11 is a partial exploded perspective view similar to FIG. 9, with the cartridge carrier housings removed to show the internal water filtration equipment therein, including the RO filter with flush-flow activation chamber, carbon-based pre-filter and particulate catalyst post-filter in relation to the respective cartridge carriers of the manifold base.
Figure 12:
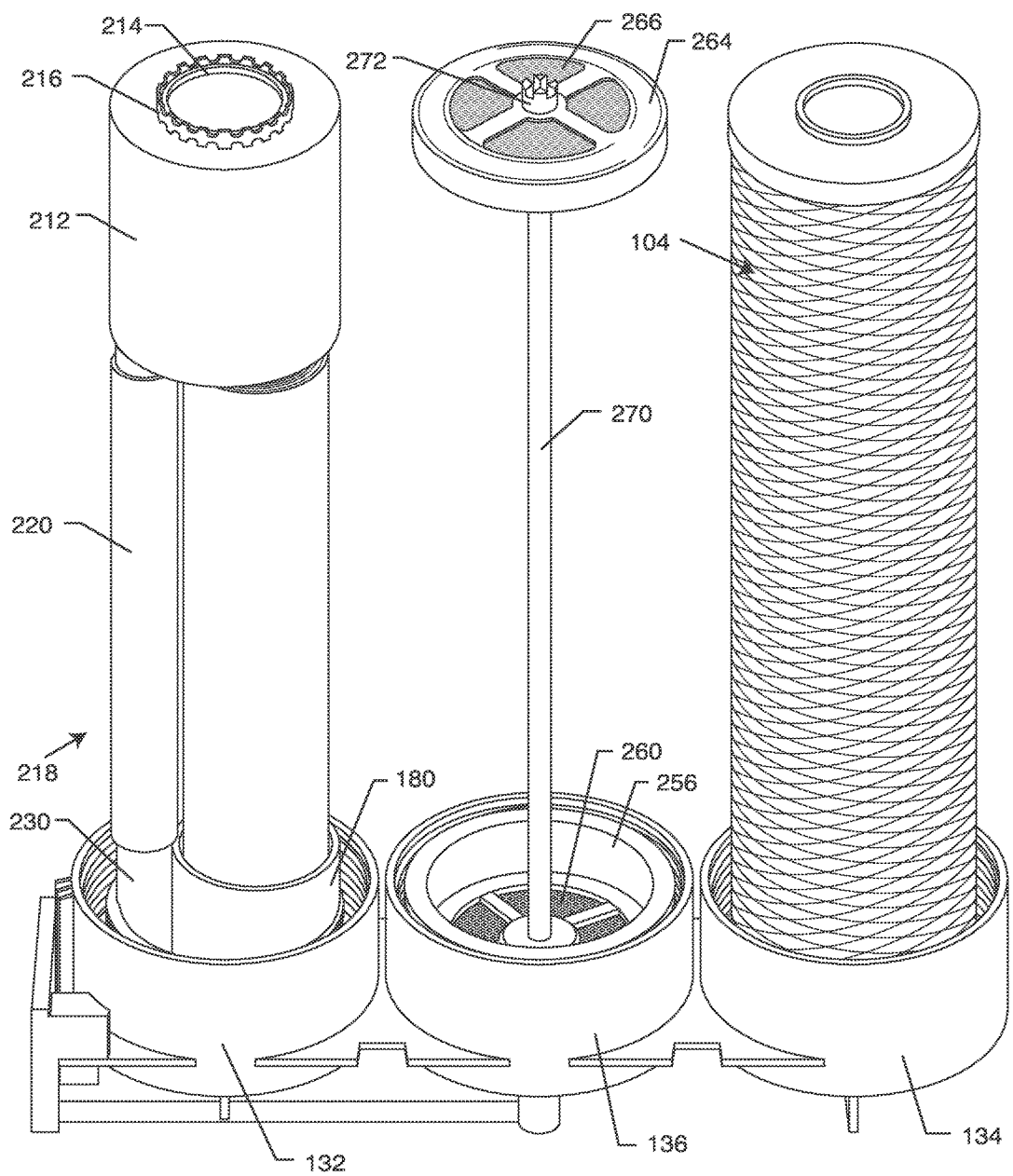
FIG. 12 is a perspective view similar to FIG. 11, illustrating installation of the RO filter and flush-flow activation chamber, the carbon-based pre-filter and the particulate catalyst post-filter in the manifold base.
Figure 13:
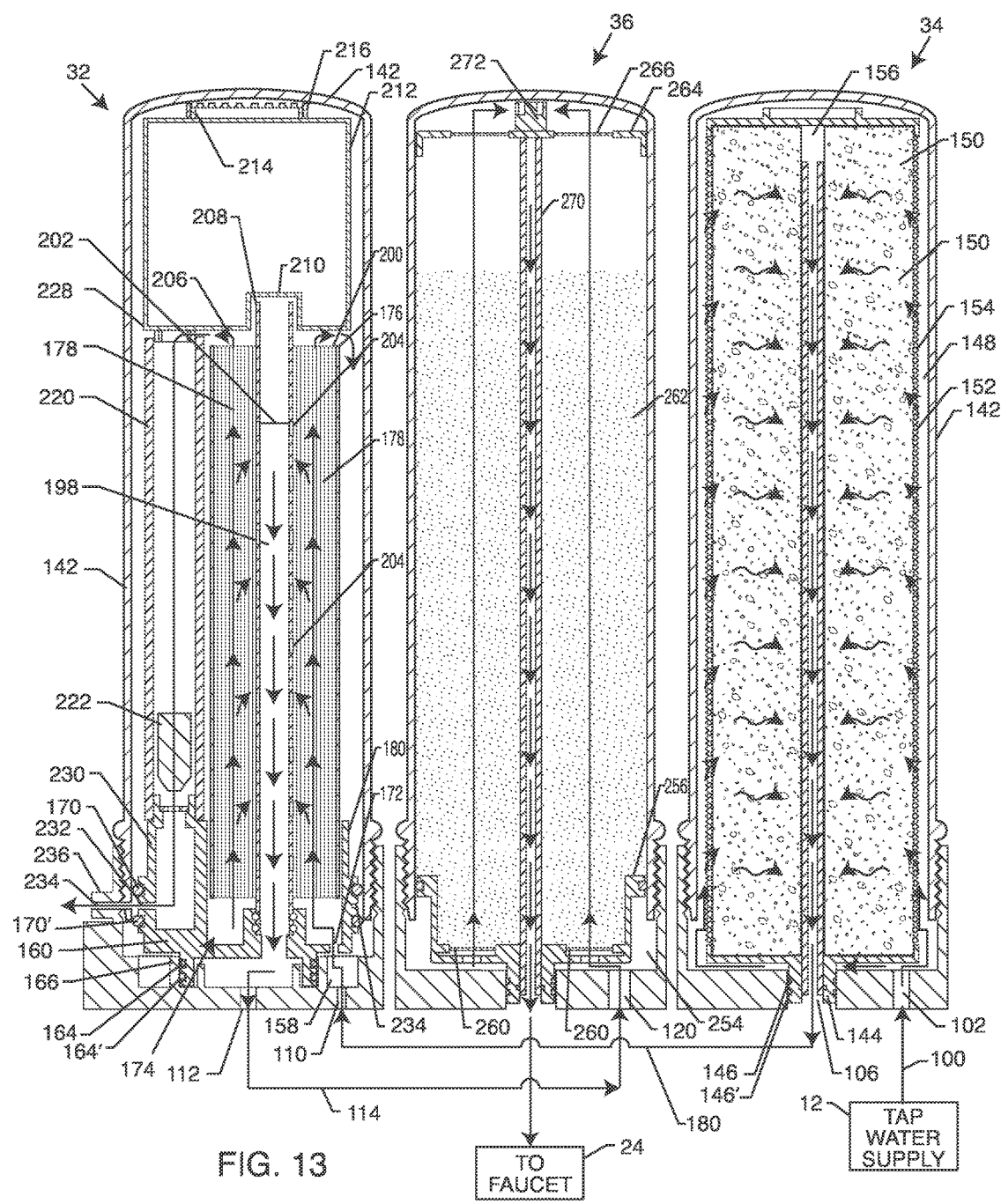
FIG. 13 is a cross-sectional view taken about the line 13-13 in FIG. 5, illustrating the internal flow characteristics of the water purification system through the carbon-based pre-filter, the RO filter, and particulate catalyst post-filter as coupled to the unitary manifold base.

This filtered tap water flow then travels out from the pre-membrane cartridge 34 via the pre-membrane outlet port 106 and into the flow path 108 (FIGS. 8 and 13), which couples to the RO inlet port 110 of the RO water filtration cartridge 32 (FIG. 13). The RO inlet port 110 permits the filtered tap water to enter into an entry channel 158 formed from a portion of the RO cartridge carrier 132 as shown in FIGS. 11 and 13. Here, the filtered tap water may enter a base unit 160 (FIGS. 13-14) at a lower section 162 thereof, which includes a pair of o-rings 164, 164' that selectively slidably engage an upstanding shoulder or wall 166 formed within the interior of the RO cartridge carrier 132 to form an air-tight and water-tight seal therebetween. The base unit 160 further includes an upper end 168 having a diameter relatively larger than the lower end 162 and sized to carry a pair of o-rings 170, 170' that selectively slidably engage the interior surface of the carrier cartridge housing 142 to form an air-tight and water-tight seal therebetween. This permits the RO water filtration cartridge 32 to separate the filtered tap water flow into a relatively pure water flow for delivery to a dispense faucet for consumption or cooking purposes and a brine water flow to be recycled into the tap water flow for use in washing or bathing, or to be discarded to a drain, as discussed below in more detail.

Figures 14, 14A, 15:
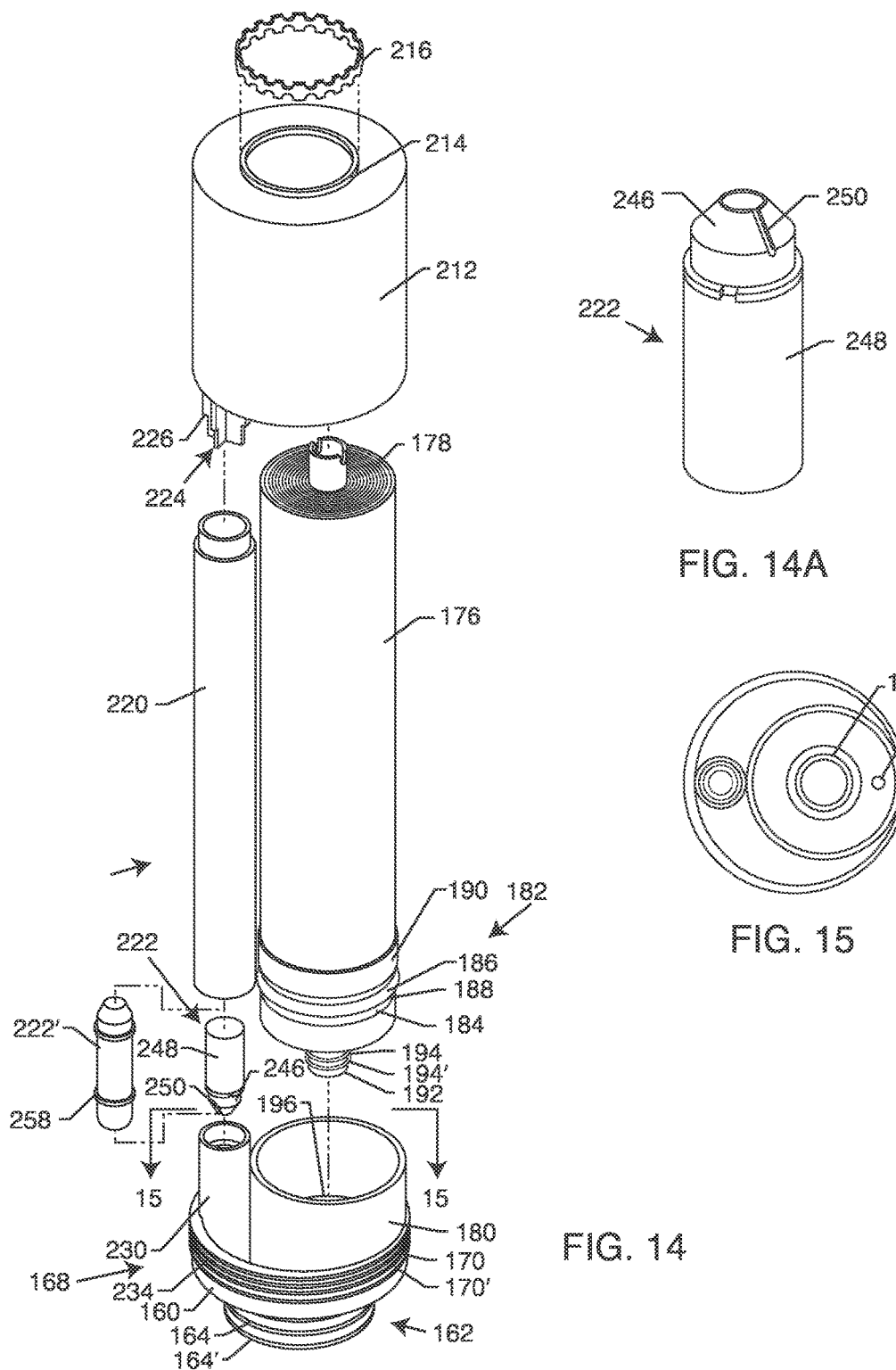
FIG. 14 is an exploded perspective view of the reverse osmosis water filtration cartridge.
FIG. 14A is an enlarged perspective view of a plunger or float, including a frusto-conical nose having a channel therein for bleeding brine water when in a nested or seated position within the flush-flow activation chamber.
FIG. 15 is a top planar view of the base unit, illustrating various couplers in the base unit.

When the lower end 162 of the base unit 160 is in seated reception within the wall 166 of the RO cartridge carrier 132, filtered tap water entering through the RO inlet port 110 flows into and fills the channel 158 below an aperture 172 that permits the filtered water flow to enter a space or region 174 (FIG. 13) immediately below an RO filter 176. As shown in FIGS. 13 and 14, the RO filter 176 couples to a filter port 180 through slide-in reception of a RO filter seal 182 having a lower section 184 and an upper section 186 that generally taper outwardly into a larger diameter point 188 that sealing engages the inner diameter or wall of the filter port 180 in the base unit 160. A piece of tape 190 may be disposed across a portion of the upper section 186 to retain the seal 182 at a specific location along the length of the RO filter 176. The seal 182 preferably outwardly terminates at the point 188 having an outer diameter somewhat larger than the inner diameter of the filter port 180 such that an air-tight and water-tight seal forms therebetween when the RO filter 176 engages the base unit 160. The seal 182 should be made from a somewhat deformable or flexible material such as rubber so as to permit insertion into the filter port 180.

Furthermore, the RO filter 176 includes a filter coupler 192 having a pair of o-rings 194, 194' thereon for selected air-tight and water tight-reception into a base unit outlet coupler 196 (FIG. 15). This way, filtered tap water entering the base unit 160 though the aperture 172 is separately maintained within the space/region 174 (FIG. 13) such that the filtered tap water must flow up into the series of membranes 178 in the RO filter 176, thereby purifying the filtered tap water into a substantially pure water flow that concentrates in an RO discharge tube 198 before delivery back to the manifold base 68 through the filter coupler 192 and the purified water outlet port 112. Preferably, the RO filter 176 is the CSM RE1812-24 Reverse Osmosis Membrane manufactured by Woongjin Chemical Company of Seoul, Korea, although persons of ordinary skill in the art may recognize that other filters known in the art may be compatible with the system 10 disclosed herein. In this respect, the RO membranes 178 preferably substantially filter out bacteria, progenies, viruses, pesticides, hydrocarbons, radioactive contaminants, turbidity, colloidal matter, chlorine, detergents, industrial wastes, asbestos, and other dissolved solids such as sodium, calcium, magnesium, sulfates and cadmium. These dissolved inorganic solids are removed from the filtered tap water by pushing the filtered tap water through the semi-permeable membranes 178. These membranes 178, which are about as thick as cellophane, only allow water to pass through, not the impurities or contaminants. The impurities or contaminants exit the RO filter 176 at a top end 200 thereof as brine water.

As shown best in FIG. 13, the RO discharge tube 198 includes a stop 202 that separates the clean or purified water side having a set of perforations 204 therein to permit pure water to exit the RO filter 176, as described above, from the brine water side. Brine water outflow, as designated by numeral 206, is allowed to exit the RO filter 176 at the top end 200 thereof because the RO filter membranes 178 remain open or exposed due to offset engagement of a standoff 208 with a complementary fitting 210 formed from a portion of a spacer or header 212. In this respect, the standoff 208 is of a length that positions the header 212 at a predefined distance above the top end 200 of the RO filter 176 to permit the brine water outflow 206 to exit the RO filter 176 as shown in FIG. 13. The stop 202 prevents this brine water outflow 206 from mixing with the pure water outflow in the RO discharge tube 198. The header 212 is also designed to fill the space remaining above the RO filter 176 so the RO water filtration cartridge 32 can house RO filters that vary in size. Furthermore, the header 212 ensures that each component in the RO filtration cartridge 32 remains in adequate engagement to prevent leakage. In this respect, the header 212 includes a somewhat circular extension 214 (FIG. 14) having an outside diameter approximately the same size as an inside diameter of a flexible or deformable corrugated spacer 216 (FIGS. 11-14). The spacer 216 may flex about its corrugations to optimally and snugly couple to the circular extension 214 for slide-fit reception thereon, and to securely bias the filtration assembly within the interior of the carrier cartridge housing 142.

Furthermore, the RO water filtration cartridge 32 further includes a flush-flow activation chamber 218 as shown in FIGS. 11-14 and 16-20. In the preferred embodiment, the flush flow activation chamber 218 generally includes a vertical tube 220 extending between the header 212 and the base unit 160. The vertical tube 220 is preferably made from a single tube (as shown in the illustrative drawings), but it may also be made from multiple interconnecting tubes, depending on the desired length. The vertical tube 220 attaches the flush-flow activation chamber 218 between the header 212 and the base unit 160 as shown. The tube 220 is configured to carry, in one embodiment, a water weight or plunger 222. As shown best in FIG. 14, the vertical tube 220 engages the outer prongs of an X-shaped extension 224 protruding out from the header 212. The X-shaped extension 224 includes a ledge or shelf 226 extending outwardly to increase the width of the extension to prevent the tube 220 from sitting flush against a bottom surface 228 (FIG. 13) of the header 212. That is, the vertical tube 220 selectively slides over and engages the X-shaped extension 224 only to the point where the outer walls of the vertical tube 220 engage the shelf 226—this permits inflow of brine water exiting the RO filter 176 into the vertical tube 220. On an opposite end, the vertical tube 220 slidably engages a substantially circular drain tube coupler 230.

As shown in FIGS. 13 and 14, the drain tube coupler 230 extends downwardly into the base unit 160 and includes an exit aperture 232 that extends through the width of the base unit housing and opens into a channel 234 between the o-rings 170, 170'. When the base unit 160 is selectively slidably retained within the carrier cartridge housing 142, the channel 234 becomes substantially aligned with one or more exit ports 236 bored in the side of the carrier cartridge housing 142 between the o-rings 170, 170'. The channel 234 permits the brine water outflow to travel circumferentially around the exterior of the carrier cartridge housing 142 until the water can escape therefrom through one of the exit ports 236. These exit ports 236 similarly open to a dispense channel formed from the outer diameter of the carrier cartridge housing 142, which fluidly couples to the brine water outflow port 116 in the manifold housing 68. Thus, brine water flow exiting the RO filter 176 enters the vertical tube 220 of the flush flow mechanism 218 through the gap formed as a result of offset seated reception of the vertical tube 220 on the shelf 226 of the X-shaped extension 224 protruding out from underneath the bottom surface 228 of the header 212 and out through the brine water outlet port 116 via the drain tube coupler 230.

The operation of the flush-flow activation chamber 218 is shown in more detail in FIGS. 14 and 16-20. More specifically, the interior of the vertical tube 220 is of a diameter that permits vertical movement of the plunger 222 therein, namely in and among the positions generally shown in FIGS. 16-20. The plunger 222 is designed to create a flush flow state or flushing condition that essentially refreshes or reenergizes the filtration equipment, and namely the membranes 178 in the RO filtration cartridge 30 and/or other particulate catalyst material that may be utilized by the system 10 for purposes of water filtration. In a relatively static state, i.e., when the system 10 is not dispensing water out through the faucet 24 or otherwise filling a reservoir (if one is being utilized), the plunger 222 is generally in the position shown in FIG. 16. Here, pressurization within the system 10 during this static state allows the weighted plunger 222 to sink to the bottom of the brine water filled vertical tube 220 for placement or engagement with a seat 240 sitting or preferably affixed to a ledge 242 formed from a portion of the interior diameter of the drain tube coupler 230. This seat 240 has an aperture 244 therein that permits brine water outflow, but may be substantially occluded by the plunger 222 when in the position shown in FIG. 16. In this respect, the plunger 222 preferably includes a nozzle or nose 246 that generally tapers inwardly from a substantially cylindrical body portion 248, as best shown in FIG. 14A. While the cylindrical body portion 248 is larger in diameter than the aperture 244, the nose portion 246 preferably tapers to a diameter somewhat smaller than the aperture 244 to permit a portion of the nose 246 to slide into and partially penetrate through the aperture 244, thereby substantially occluding brine water flow therethrough.

Figure 16:
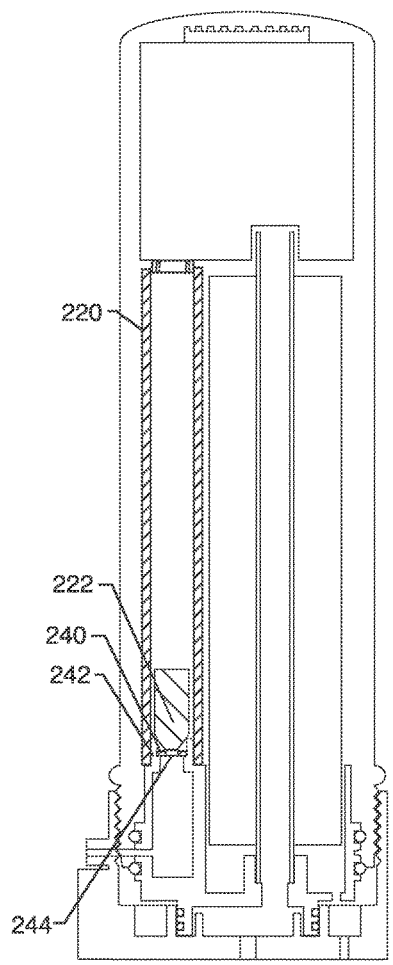
FIG. 16 is a cross-sectional view of the reverse osmosis water filtration cartridge taken about the line 16-16 in FIG. 5, illustrating one embodiment of a flush-flow activation chamber having a plunger in a seated position substantially occluding brine water outflow.

When in the seated position shown in FIG. 16, the system 10 is in a relatively static state wherein pure water production has ceased, such as when the faucet 24 is closed or when the pure water reservoir or storage vessel shown and described in U.S. Pat. No. 8,298,420 is full. Despite being in a relatively static state, the nose 246 may still permit brine water outflow through the aperture 244 by means of a narrow slot 250 formed as a channel or conduit along the narrowing or tapered portion of the nose 246, as shown best in FIG. 14A. The slot 250 permits metered brine water outflow during this relative static state to prevent the system 10 from becoming completely stagnant after extended durations of no water flow. The plunger 222 essentially functions as a flow limiter to prevent substantial outflow of brine water, which beneficially reduces water waste during times of non-use. Of course, a person of ordinary skill in the art will readily recognize that the flush-flow activation chamber 218 will also work with a plunger that excludes the slot 250. In this embodiment, and when the system 10 reaches the substantially static state described above, the plunger fully engages the seat 240 such that the nose 246 preferably entirely occludes flow through the aperture 244, thereby ceasing all water flow out through brine water outlet port 26.

Opening the faucet 24 to dispense pure water causes the system 10 to reengage in the production of pure water—either to meet on-demand dispensing needs or to refill the reservoir (if one is used). In this condition, the RO filtration cartridge 32 experiences a pressure drop as a result of the increased velocity of water traveling therethrough. That is, dispensing pure water from the faucet 24 creates a vacuum immediately therebehind, which allows pressurized tap water to inflow into the system 10 to reengage in pure water production. The plunger 222 will remain in seated engagement with the seat 240 until the back pressure at the top of the vertical tube 220 draws the plunger 222 out from engagement therewith. For this to happen, the pressure drop behind the plunger 222 must decrease to some threshold level that draws the weighted plunger 222 out from said seated engagement. A person of ordinary skill in the art will appreciate that there will be some delay between the time when pure water production is reinitialized by opening the faucet 24 and the time when the plunger 222 disengages the seat 240. To this extent, the system 10 experiences an increasing back pressure near the top end 200 of the RO filter 176, and especially in and around the area where the vertical tube 220 engages the X-shaped extension 224. When this "vacuum" exceeds the weighted force keeping the plunger 222 engaged with the seat 240, the plunger 222 pulls or pops out from within the aperture 244.

Here, the water purification system 10 experiences a short, yet noticeable change in water pressure that reverberates throughout the flow paths in the fixed manifold 58 and the manifold base 68, and especially through RO filtration cartridge 32, the pre-membrane cartridge 34 and the post-membrane cartridge 36. More specifically in this respect, the system 10 experiences a rush of water out from the vertical tube 220 through the now open aperture 244, thereby creating a vacuum (i.e., decreased pressure) therebehind as a result of increased fluid flow velocity. This vacuum consequently results in a sudden increase or flash flush of tap water inflow in through the tap water inlet port 16. This so-called flush flow has the effect of flashing an increased flow of tap or filtered water over the RO filter membranes 178 to effectively dislodge or remove contaminant particulate matter that may have accumulated thereon. In a sense, the flush-flow activation chamber 218 is a built-in self-cleaning device that clears the RO filter membranes 178 of build-up that otherwise may damage the membranes 178 and shorten its service life.

Figure 17:
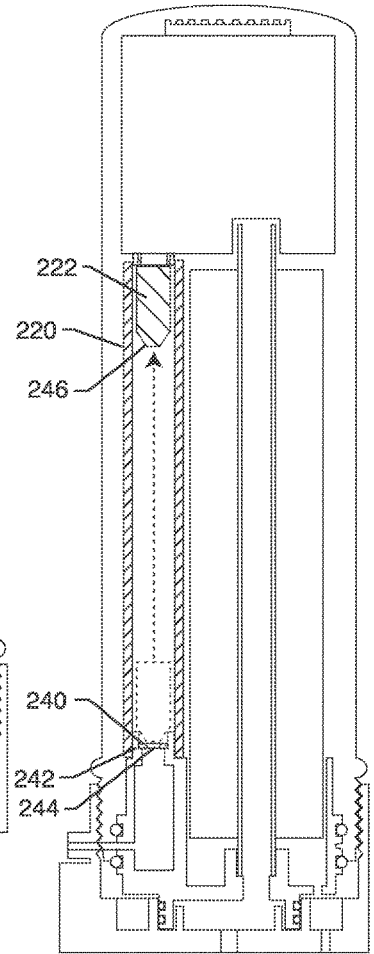
FIG. 17 is an alternative cross-sectional view similar to FIG. 16, illustrating movement of the flush-flow plunger from an engaged position to a disengaged position substantially permitting brine water outflow.
Figure 18:
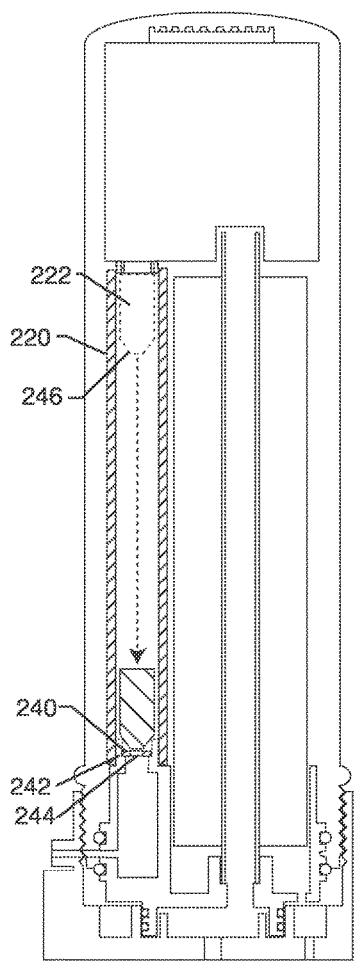
FIG. 18 is an alternative cross-sectional view similar to FIGS. 16 and 17, further illustrating movement of the flush-flow plunger from the disengaged position to reengage the seated position again occluding brine water outflow.

While pure water is being produced, the plunger 222 remains near the top of the vertical tube 220 as shown in FIG. 17 so that brine water outflow may exit the RO filtration cartridge 32, as described above. When pure water dispensing ceases, either by turning off the faucet 24 or by substantially filling the reservoir or storage vessel (if used), pure water production through the RO filter 176 decreases, thereby allowing the plunger 222 to sink back down toward engagement with the seat 240 as shown in FIG. 18. So, during non-operation, i.e., when pure water is not being dispensed from the faucet 24 or otherwise filing the reservoir or storage vessel, the desired rate of brine water production through the flush-flow activation chamber 218 is reduced to a minimal amount, i.e., the volume of water through the slot 250, if one is used. In this respect, the plunger 222 preferably falls back down to the position shown in FIGS. 16 and 18 such that the nozzle or nose 246 repositions itself back within the aperture 244 whereby brine water outflow exits the vertical tube 220 only through the channel or slot 250. The flush-flow activation chamber 218 then reactivates the next time the faucet 24 is opened.

The characteristics of the vertical tube 220 and the plunger 222 govern the speed, force and duration of the flush-flow activation chamber 218. For example, in the embodiment shown in FIGS. 16-18, the plunger 222 generally includes a cylindrical body portion 248 having a tapered frusto-conically shaped nose 246 that includes an angled channel or slot 250 therein that permits a relatively low volume of brine water to flow through the aperture 244 at times of little or no pure water production. Furthermore, the outer diameter of the cylindrical body portion 248 is slightly smaller in diameter relative to the inner diameter of the vertical tube 220. This permits some fluid flow through and around the plunger 222 and has a tendency to require a higher vacuum within the system 10 to dislodge the plunger 222 from the seat 240 than an embodiment wherein the vertical tube 220 has an inner diameter appreciably larger than the outer diameter of the plunger. Although, conversely, the smooth outer diameter of the cylindrical body portion 248 does reduce turbulence along the surface of the plunger 222, thereby relatively reducing the needed back pressure to dislodge the plunger 222 from the seat 240. For example, the plunger 222 may be dislodged from the seat 240 with relatively less force than plunger 222' (FIGS. 19-20), thereby creating a relatively lower flushing force across the membranes 178 and other filtration equipment.

The flush-flow activation chamber 218 may also be changed in numerous other ways to regulate the rate of resetting the flush-flow mechanism, and the speed and force of the flush-flow when the mechanism activates. For example, lengthening the vertical tube 220 will increase the time it takes the plunger 222 to reseat after the active water purification state, thus decreasing the intervals between flush-flows. The same is true in the inverse, i.e., when more frequent flush flows are desired, the system 10 could include a shorter vertical tube 220. Alternatively, a plunger having an outside diameter approximately the same size of the inside diameter of the vertical tube 220 requires greater pressure therein for removal from the seat 240 because of less fluid flow characteristics in and around the plunger 222, thereby increasing the force of the flush-flow when the plunger does release. The alternative is, of course, that a relatively larger inside diameter vertical tube 220 and/or a relatively smaller outer diameter plunger will require less force for removal and generate less flush-flow force across the system 10.

Figure 19:
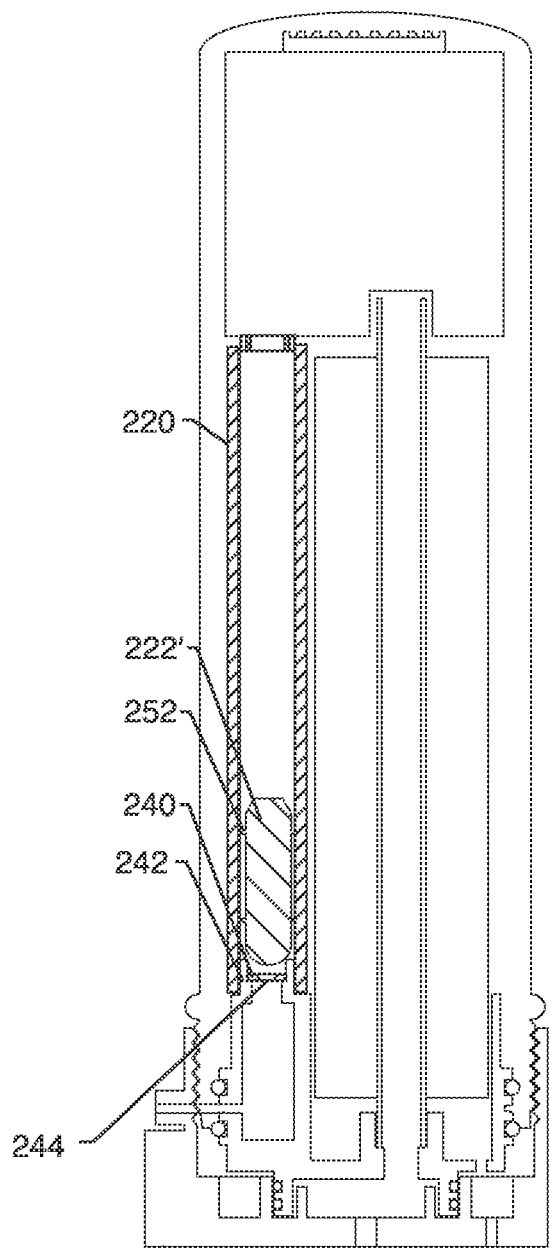
FIG. 19 is a cross-sectional view similar to FIG. 16, illustrating an alternative plunger for use with the flush flow activation chamber disclosed herein.
Figure 20:
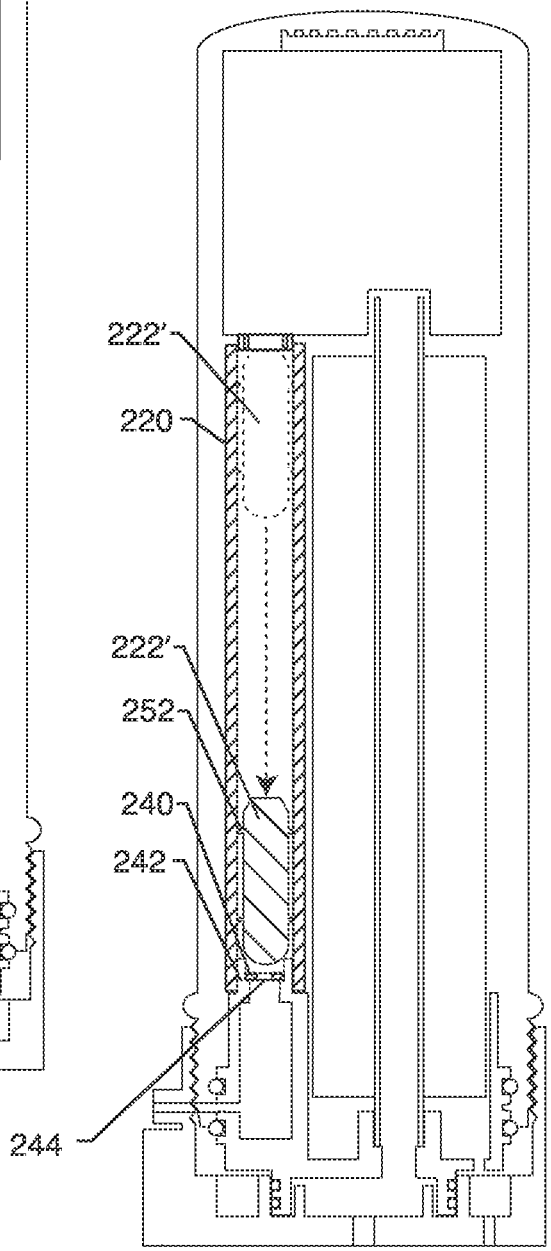
FIG. 20 is a cross-sectional view similar to FIG. 19, illustrating movement of the alternative plunger from a disengaged position to an engaged position.

Of course, the flow characteristics inside the vertical tube 220 could be governed by other features. For example, in one embodiment as shown in FIGS. 19-20, an alternative plunger 222' may have a set of fins 252 that extend outwardly from the cylindrical body thereof to more closely track the internal diameter of the vertical tube 220. In this embodiment, the plunger 222' will tend to resist fluid flow around its body, especially by decreasing the flow characteristics in and around the fins 252. Such increased turbulence tends to resist movement, as opposed to laminar flow that may be more readily experienced with the smoother cylindrical body portion 248, within the vertical tube 220. As a result, the system 10 must produce a higher force to dislodge the plunger 222' from the seat 240, which results in a larger flush-flow across the RO membranes 178 and other filtration equipment. Of course, a person of ordinary skill in the art will readily recognize that other modifications may be made to the size and shape of the vertical tube 220 and to the plunger 222 to regulate the rate the plunger 222 disengages or reengages the seat 240 in accordance with the embodiments described herein.

For example, in another embodiment, the weight of the plunger 222 has bearing on the operation on flush-flow activation. More specifically, in one embodiment where the plunger is used as a sink, increasing the weight of the plunger will increase the rate at which the plunger returns to the seat 240. The same is true in the inverse, namely decreasing the weight of the plunger increases the rate at which it raises within the vertical tube 220 and decreases the rate it falls when the system back pressure is removed. In this case, the flush-flow activation occurs less frequently due to the relatively longer time it takes the plunger to reseat. In another alternative, a float may be used instead of a weighted plunger. In this respect, instead of sinking, the float is buoyant within the vertical tube 220 and tends to rise therein for engagement with the seat 240 during times of non-use or relatively slow pure water production, the float then is pulled downwardly by the vacuum back pressure when the faucet 24, for example, is opened such that the system 10 experiences higher velocity inflow to produce on-demand purified water for consumption. Here, increasing the buoyancy of the float increases the rate it returns to the seated position, and vice versa.

As described above, pure water produced by the RO filtration cartridge 32 exits through the purified water outlet port 112 and travels through the flow path 114 (FIG. 8) to the post-membrane cartridge 36. This post-membrane cartridge 36, as shown in FIGS. 11-13 and 21, includes the post filtration inlet port 120 for receiving this pure water inflow from the RO water filtration cartridge 32. This purified water enters the post-membrane cartridge 36 through the post filtration inlet port 120 into a space or chamber 254 (FIGS. 13 and 21) formed beneath a lower catalyst filter element 256. A set of flow apertures 258 are covered by a filter or screen 260 to the inboard side relative to the purified water inflow. The screens 260 permit purified water inflow, while preventing the relatively larger particle particulate catalyst media 262 from back flowing out the flow apertures 258. An upper catalyst filter element 264 has a similar filter or screen 266 to permit purified water outflow from a catalyst cleansing chamber, formed generally between these two filter elements 256, 266, and into a headspace 268. The catalyst cleansing chamber is at least partially filled (preferably less than ½ the chamber volume) with particulate catalyst media or agent 262 such as zinc, a copper-zinc catalyst mixture, or the like. A portion of the catalyst zinc dissolves into the pure water flow passing therethrough, for purposes of maintaining water and storage tank freshness. Purified and enriched water exits the catalyst cleansing chamber through the screen 266 and into the headspace 268 for eventual travel out through a hollow central stem 270 having a crowned head 272. The purified water discharges the post-membrane cartridge 36 through the post-membrane outlet 124 for travel in the flow path 126 to the control valve 130 and for eventual dispensing out through the faucet 24.

Figure 21:
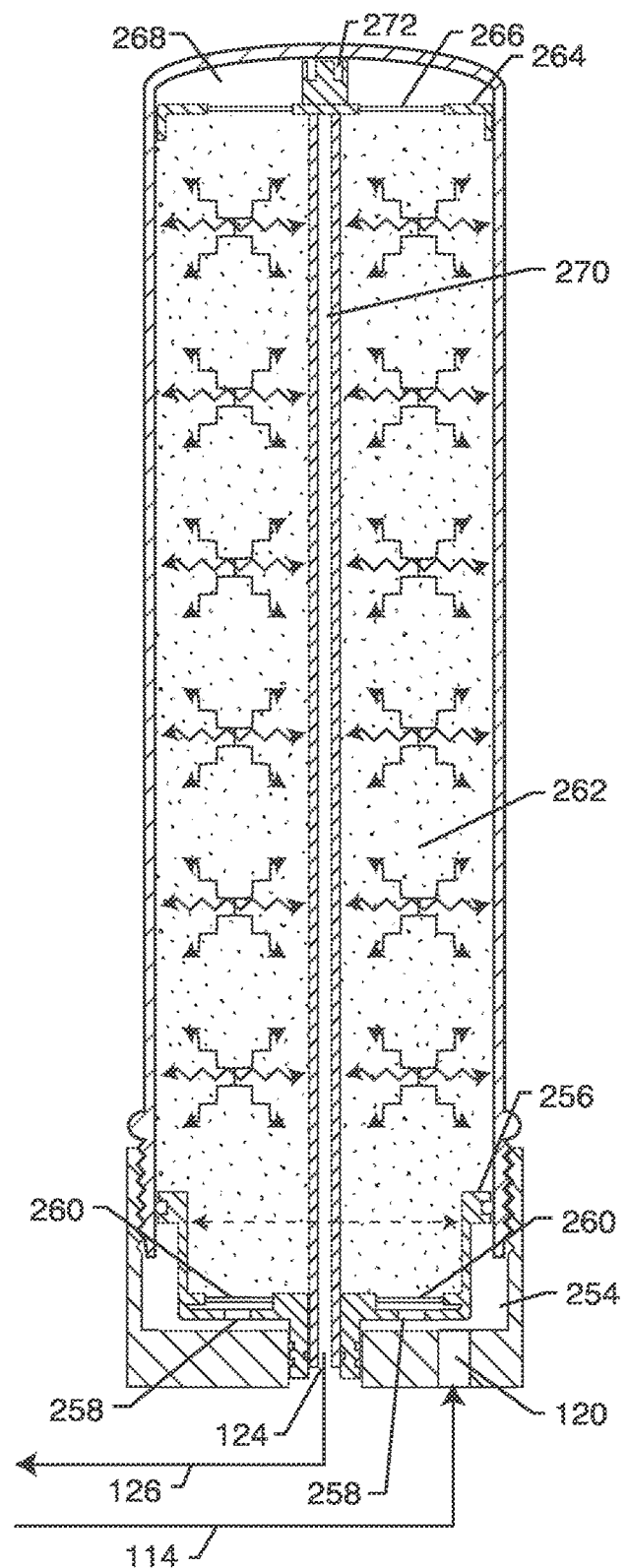
FIG. 21 is a cross-sectional view of the particulate catalyst post-membrane filtration cartridge taken about the line 21-21 in FIG. 5, illustrating disruption of the particulate catalyst material therein when refreshed by the flush-flow activation chamber.

The particulate catalyst media 262 within the post-membrane cartridge 36 is periodically refreshed by the flush-flow activation chamber 218 to achieve extended service life compatible with the extended service life of the RO membrane 38. For example, fluid flow within the system 10 slows significantly when the faucet 24 is turned "off" and/or when the reservoir is fills (if used). At this stage, pure water production slows and brine water discharge slows to a drip through the aforementioned slot 250. Particulate catalyst media 262 known in the art has a tendency to clump together during relatively slow tap water inflow and related pure water production. As such, the particulate catalyst media 262 forms channels therein that can significantly decrease filtration performance over time because a relatively small amount of catalyzing material remains exposed to water traveling through the post-membrane cartridge 36. When the flush-flow mechanism described above activates, it causes a sudden increase in the velocity of water travelling into the cartridge through the post-filtration inlet port 120. This water rushes into the catalyst cleansing chamber resulting in stirring and fluidizing of the media 262 (e.g., as shown in FIG. 21 relative to FIG. 13) sufficient to turbulently abrade and refresh the media 262. This feature of the system 10 further extends the operational service life of the media 262 as it intermittently breaks apart and refreshes the particulate catalyst media 262.

Although several embodiments have been described in detail for purposes of illustration, various modifications may be made without departing from the scope and spirit of the invention. Accordingly, the invention is not to be limited, except as by the appended claims.

What is claimed is:

1. A water purification system with automatic flush flow, comprising:
    a water purification unit having a tap water inflow port for receiving a tap water inflow from a water supply system to produce a supply of purified water discharged from said water purification unit via a purified water outflow port, and a brine water outflow having impurities concentrated therein and discharged from said water purification unit via a brine outflow port;
    said water purification unit including a reverse osmosis (RO) filter having an RO membrane for separating the tap water inflow into said purified water and said brine water outflow; and
    a flush flow activation chamber comprising a substantially vertical tube that is fluidly coupled to the RO filter to receive said brine water outflow at a top of the substantially vertical tube, and to drain through an aperture at a bottom of said substantially vertical tube, the substantially vertical tube having a weighted plunger therein for substantially occluding said brine water outflow through the aperture to said brine outflow port when in a first seated position, and substantially permitting said brine water outflow to exit said water purification unit through said brine outflow port when in a second unseated position;
    wherein when the water purification system is not dispensing purified water or filling a reservoir, increased pressurization within the water purification unit allows the weighted plunger to sink to the bottom of the brine water in the vertical tube to the first seated position,
    when the water purification system is not dispensing purified water, pressure drops in the RO filter to create back pressure at the top of said substantially vertical tube until the back pressure reaches a threshold level that draws the weighted plunger out of the first seated position to the second unseated position, and
    brine water draining from the vertical tube through the aperture when said weighted plunger moves from said first seated position to said second unseated position to generate back pressure on the RO filter to produce a sudden increase of inflow through the tap water inflow, the increase of inflow to flush flow said tap water inflow into said purification unit and through said RO membrane, thereby refreshing said RO membrane.

2. The water purification system of claim 1, wherein said weighted plunger comprises an elongated cylindrical body having a substantially frusto-conical head sized for at least partial insertion into a seat having said aperture, the seat being adjacent to said brine outflow port, an outer diameter of the elongated cylindrical body being smaller than an inner diameter of the substantially vertical tube to allow fluid flow around the weighted plunger in the second unseated position.

3. The water purification system of claim 1, wherein said weighted plunger includes a slot formed along a narrowing or tapered portion of a substantially frusto-conical head permitting said brine water outflow through said brine water outflow port when said weighted plunger is in said first seated position.

4. The water purification system of claim 1, wherein said weighted plunger includes a fin extending radially outwardly toward the substantially vertical tube, at least partially increasing a fluid turbulence of fluid flowing around a body of the weighted plunger within said activation chamber, thereby increasing the threshold level.

5. The water purification system of claim 1, wherein said purification unit comprises a multi-cartridge unit including an RO filter cartridge and a catalyst media cartridge, said multi-cartridge unit adapted for unidirectional installation within a manifold housing.

6. The water purification system of claim 5, wherein said manifold housing and said multi-cartridge unit further include inter-engageable ported members for sealed fluid-coupled engagement when said multi-cartridge unit is installed into said manifold housing.

7. The water purification system of claim 6, including a manifold base carried by said manifold housing in a slide unit for removable unidirectional seated installation of said multi-cartridge unit, said slide unit being movable between an extended position permitting access to and removal and replacement of said multi-cartridge unit, and a retracted position with said inter-engageable ported members in sealed fluid-coupled engagement.

8. The water purification system of claim 1, wherein said purification unit further includes a pre-filter coupled between said tap water inflow port and said RO filter, said pre-filter including a solid carbon media for suspending impurities from said tap water inflow.

9. The water purification system of claim 1, wherein said purification unit further includes a post-filter coupled between said RO filter and said purified water outflow port, said post-filter including a particulate catalyst media.

10. The water purification system of claim 9, wherein said particulate catalyst media includes zinc.

11. The water purification system of claim 1, including a faucet coupled to said purified water outflow port for dispensing the produced purified water.

12. A water purification system with automatic flush flow for producing a supply of purified water and a supply of brine water having impurities concentrated therein, comprising:
    a multi-cartridge unit having a manifold base with a tap water inflow port for receiving a tap water inflow from a water supply system, and a purified water outflow port and a brine outflow port for respectively discharging said purified water and said brine water out from said multi-cartridge unit;
    a reverse osmosis (RO) filter cartridge in flow-coupled relation with said manifold base, said RO filter cartridge including an RO membrane for separating said tap water inflow into said purified water and said brine water;
    a post-membrane cartridge in flow coupled relation with said manifold base between said RO filter cartridge and said purified water outflow port, said post-membrane cartridge housing a particulate catalyst media; and
    a flush flow activation chamber in flow-coupled relation with the RO filter cartridge to receive said brine water, the brine water to pass through the flush flow activation chamber to be drained out said brine outflow port, and having a throttle that changes position within the flush flow activation chamber in response to changes in pressurization of the brine water received from the RO cartridge, the throttle substantially occluding said brine water from draining through said flush flow activation chamber to said brine outflow port when in a first seated position in response to increased pressurization of the brine water, and substantially permitting said brine water to exit said multi-cartridge unit through said brine outflow port when in a second unseated position in response to decreased pressurization of the brine water to a threshold pressure; and said activation chamber generating back pressure within said water purification system when water drains to said brine water due to movement of the throttle from the first seated position to the second unseated position, the back pressure to increase tap water inflow into the RO filter cartridge to flush water through said RO filter cartridge and over said RO membrane sufficient to wash said membranes and to flush flow water through said post-membrane cartridge sufficient to agitate and stir said particulate catalyst media.

13. The water purification system of claim 12, wherein said throttle includes a slot formed from a portion of a substantially frusto-conical head to permit said brine water to bleed through said brine water outflow port when said throttle is in said first seated position.

14. The water purification system of claim 12, wherein said throttle includes a radially outwardly projecting fin configured to resist movement from said first seated position to said second unseated position, thereby increasing activation back pressure.

15. The water purification system of claim 12, wherein said particulate catalyst media includes zinc.

16. The water purification system of claim 12, wherein said multi-cartridge unit further includes a pre-membrane cartridge in flow-coupled relation with said manifold base between said tap water inflow port and said RO filter cartridge, said pre-filter cartridge including a solid carbon media for suspending impurities from said tap water inflow.

17. The water purification system of claim 12, including a faucet coupled to said purified water outflow port for dispensing the produced purified water.

18. The water purification system of claim 12, wherein said multi-cartridge unit is adapted for removable unidirectional seated installation within a slide unit of a manifold housing, said slide unit being movable between an extended position permitting access to and removal and replacement of said multi-cartridge unit, and a retracted position.

19. The water purification system of claim 18, wherein said manifold housing and said multi-cartridge unit further include inter-engageable ported members for sealed fluid-coupled engagement when said multi-cartridge unit is installed into said manifold housing and said slide unit is in said retracted position.

20. A reusable multi-cartridge water purification unit with automatic flush flow for unidirectional installation into a water purification system, comprising:
a manifold base having a tap water inflow port for receiving a tap water inflow from a water supply system, a purified water outflow port for discharging a pure water outflow, and a brine outflow port for discharging a supply of brine water outflow having impurities concentrated therein;
a pre-membrane cartridge in flow-coupled relation with said tap water inflow, said pre-membrane cartridge including a carbon media for suspending impurities from said tap water inflow;
a post-membrane cartridge in flow-coupled relation between a reverse osmosis (RO) filter and said purified water outflow port, said post-membrane cartridge including a particulate catalyst media; and
an RO water filtration cartridge including an RO membrane of the RO filter in flow-coupled relation with said manifold base between said pre-membrane cartridge and said post-membrane cartridge, said RO water filtration cartridge further including a flush flow mechanism comprising a substantially vertical tube having a weighted plunger therein, the flush flow mechanism to receive brine water outflow from the RO filter at a top of the substantially vertical tube and to drain through an aperture at a bottom of said substantially vertical tube to said brine outflow port, the weighted plunger to sink to the bottom of the brine water in the substantially vertical tube to substantially occlude said brine water outflow through said aperture when in a closed position, and substantially permitting said brine water outflow when in an open position;

said weighted plunger intermittently moving between said closed and open positions in response to changes in fluidic pressure of the brine water outflow into the substantially vertical tube, the weighted plunger rising to the open position in response to a decrease of the fluidic pressure to a threshold pressure, water draining from the substantially vertical tube through the aperture to generate back pressure on the RO filter to increase inflow through the tap water inflow, the increased inflow to flush flow water over said RO membrane and through said particulate catalyst, thereby refreshing said RO membrane and stirring said particulate catalyst to prevent channeling.

21. The water purification system of claim 20, wherein said weighted plunger comprises an elongated cylindrical body having a substantially frusto-conical head sized to occlude said brine outflow through said aperture.

22. The water purification system of claim 21, wherein said weighted plunger includes a slot formed in said frusto-conical head permitting said brine water outflow through said aperture to said brine water outflow port when said weighted plunger is in said closed position.

23. The water purification system of claim 20, including a manifold housing having a slide unit for unidirectional receipt of said multi-cartridge unit, said slide unit being movable between an extended position permitting access to and removal and replacement of said multi-cartridge unit, and a retracted position with said multi-cartridge unit housed within said manifold housing.

24. The water purification system of claim 23, wherein said manifold housing and said multi-cartridge unit include inter-engageable ported members for sealed fluid-coupled engagement when said multi-cartridge unit is installed into said manifold housing.

25. The water purification system of claim 20, wherein said particulate catalyst media includes zinc.

26. The water purification system of claim 20, wherein said weighted plunger includes a fin extending radially outwardly toward the substantially vertical tube for increasing said threshold pressure.

27. The water purification system of claim 20, wherein said flush flow of water through said post-membrane cartridge is sufficient to lift and turbulently stir said particulate catalyst media in a manner to remove an oxidation layer thereon and for flushing said removed oxidation layer out from said post-membrane cartridge thereby refreshing said particulate catalyst media.

\* \* \* \* \*